(12) United States Patent
Brucker et al.

(10) Patent No.: US 12,123,794 B2
(45) Date of Patent: Oct. 22, 2024

(54) PIRANI GAUGE WITH MODEL OF POWER DISSIPATION

(71) Applicant: MKS Instruments, Inc., Andover, MA (US)

(72) Inventors: Gerardo A. Brucker, Longmont, CO (US); Scott C. Heinbuch, Fort Collins, CO (US); Timothy C. Swinney, Fort Collins, CO (US)

(73) Assignee: MKS INSTRUMENTS, INC., Andover, MA (US)

( * ) Notice: Subject to any disclaimer, the term of this patent is extended or adjusted under 35 U.S.C. 154(b) by 98 days.

(21) Appl. No.: 18/045,685

(22) Filed: Oct. 11, 2022

(65) Prior Publication Data

US 2024/0118158 A1   Apr. 11, 2024

(51) Int. Cl.
*G01L 21/12* (2006.01)
(52) U.S. Cl.
CPC .................................... *G01L 21/12* (2013.01)
(58) Field of Classification Search
CPC ......... G01L 21/12; G01L 21/10; G01L 21/14; G01L 21/00; G01L 21/32; G01L 21/34;
(Continued)

(56) References Cited

U.S. PATENT DOCUMENTS

| 4,755,669 A | 7/1988 | Grant et al. |
| 4,765,188 A | 8/1988 | Krechmery et al. |

(Continued)

FOREIGN PATENT DOCUMENTS

| CN | 101568817 A | 10/2009 |
| CN | 105814414 A | 7/2016 |

(Continued)

OTHER PUBLICATIONS

Southard, A. et al., "Fast Pressure Prediction with a MEMS Pirani Sensor for Protection of MOMA-MS", HEMS Workshop Sep. 13-16, 2015.

(Continued)

*Primary Examiner* — Andre J Allen
(74) *Attorney, Agent, or Firm* — Hamilton, Brook, Smith & Reynolds, P.C.

(57) ABSTRACT

A thermal conductivity gauge implements a model of power dissipation to accurately measure gas pressure. An envelope surrounds a gas volume, and a sensor wire is positioned within the gas volume. The controller provides a model of power dissipation from the thermal conductivity gauge, including power loss due to conductive heat loss from sensor wire end contacts, radiative loss from the sensor wire toward the gas envelope, and pressure dependent conductive heat loss from the sensor wire through surrounding gas. The controller then applies a power input to the sensor wire to heat the sensor wire, and measures total power dissipation $W_T$, sensor wire temperature $T_s$, and envelope temperature $T_e$ during the application of the power input. Gas pressure within the envelope is determined based on the measured $W_T$, $T_s$ and $T_e$ and the model of power dissipation.

35 Claims, 22 Drawing Sheets

(58) Field of Classification Search
CPC ....... G01L 21/30; G01L 9/0022; G01L 19/04;
G01L 21/22; G01L 27/005; G01L 19/143;
G01L 11/002; G01L 27/002; G01L 19/06;
G01L 13/025; G01L 19/0061; G01L 9/00;
G01L 9/0002; G01L 9/0072; G01L 9/025;
G01L 15/00; G01L 7/026; G01L 13/023;
G01L 13/026; G01L 19/0038; G01L
19/0636; G01L 19/0645; G01L 19/142;
G01L 19/149; G01L 9/003; G01L 9/0054;
G01L 9/0055; G01L 9/0073; G01L 9/008;
G01L 19/147; G01L 19/148; G01L
27/007; G01L 9/0041; G01L 19/08; G01L
19/086; G01L 19/12; G01L 19/0084;
G01L 19/083; G01L 19/144; G01L
9/0075; G01L 19/00; G01L 19/0007;
G01L 19/0092; G01L 19/02; G01L
19/0609; G01L 19/0618; G01L 19/0672;
G01L 21/24; G01L 23/06; G01L 11/04;
G01L 21/02; G01L 23/125; G01L 27/00;
G01L 7/00; G01L 9/0016; G01L 9/0047
See application file for complete search history.

(56) References Cited

U.S. PATENT DOCUMENTS

| | | |
|---|---|---|
| 5,079,954 A | 1/1992 | O'Neal, III |
| 5,475,623 A * | 12/1995 | Stocker ................. G01D 3/036 327/350 |
| 5,557,972 A | 9/1996 | Jacobs et al. |
| 5,608,168 A | 3/1997 | Schoroth |
| 5,668,320 A | 9/1997 | Cowan |
| 5,693,888 A | 12/1997 | Enderes et al. |
| 6,023,979 A | 2/2000 | Bills et al. |
| 6,945,119 B2 * | 9/2005 | Bills ....................... G01L 21/12 73/19.05 |
| 6,973,834 B1 | 12/2005 | Golan |
| 7,207,224 B2 | 4/2007 | Rutt et al. |
| 7,331,237 B2 | 2/2008 | Borenstein |
| 7,456,634 B2 | 11/2008 | Knott |
| 7,613,586 B2 | 11/2009 | Higashi |
| 8,171,801 B2 | 5/2012 | LeNoc et al. |
| 8,893,554 B2 | 11/2014 | Stambaugh |
| 9,335,231 B2 | 5/2016 | Gu et al. |
| 9,970,838 B2 | 5/2018 | Minami |
| 10,753,816 B2 | 8/2020 | Kornelsen et al. |
| 10,845,263 B2 | 11/2020 | Brucker et al. |
| 11,656,139 B2 * | 5/2023 | Brucker .................. G01L 9/00 73/754 |
| 11,808,643 B2 * | 11/2023 | Brucker .................. G01L 21/14 |
| 2002/0163345 A1 | 11/2002 | Jeong et al. |
| 2009/0056464 A1 | 3/2009 | Qader et al. |
| 2009/0199649 A1 | 8/2009 | Kawasaki |
| 2010/0034236 A1 | 2/2010 | Ploechinger |
| 2014/0001578 A1 | 1/2014 | Walchli et al. |
| 2016/0178420 A1 | 6/2016 | Sasaki |
| 2018/0364127 A1 | 12/2018 | Kornelsen et al. |
| 2019/0316981 A1 | 10/2019 | Brucker |
| 2021/0208016 A1 | 7/2021 | Brucker et al. |
| 2023/0366763 A1 * | 11/2023 | Brucker ................. G01L 21/10 |

FOREIGN PATENT DOCUMENTS

| | | |
|---|---|---|
| CN | 107894300 A | 4/2018 |
| DE | 202014007298 U1 | 1/2016 |
| EP | 2120031 A1 | 11/2009 |
| TW | 200813682 A | 3/2008 |
| WO | 2000/054018 A1 | 9/2000 |
| WO | 2007017625 A1 | 2/2007 |
| WO | 2019203929 A1 | 10/2019 |

OTHER PUBLICATIONS

International Search Report and Written Opinion for Int'l Application No. PCT/US2019/019368 dated May 23, 2019.

International Search Report and Written Opinion received for PCT Patent Application No. PCT/US2023/076202, mailed on Jan. 25, 2024, 12 pages.

* cited by examiner

PIRANI GAUGE WITH MODEL OF POWER DISSIPATION

BACKGROUND

Because the rate of heat transfer through a gas is a function of the gas pressure, under certain conditions, measurements of heat transfer rates from a heated sensing element to the gas can, with appropriate calibration, be used to determine the gas pressure. This principle is used in the well-known Pirani gauge, in which heat loss is measured with a Wheatstone bridge network or other circuitry, which serves both to heat the sensing element and to measure its resistance. In many Pirani gauges, a temperature-sensitive resistance is connected as one arm of a Wheatstone bridge. The temperature-sensitive resistance is exposed to the vacuum environment whose pressure is to be measured.

A conventional Pirani gauge is calibrated against several known pressures to determine a relationship between pressure of a gas and the power loss to the gas or the bridge voltage. Then, assuming end losses and radiation losses remain constant, the unknown pressure of a gas may be directly determined by the power lost to the gas or related to the bridge voltage at bridge balance.

SUMMARY

Example embodiments include a thermal conductivity gauge comprising an envelope surrounding a gas volume, a sensor wire positioned within the gas volume, and a controller. The controller may be configured to provide a model of power dissipation from the thermal conductivity gauge, the model including power loss due to conductive heat loss from sensor wire end contacts, radiative loss from the sensor wire toward the gas envelope, and pressure dependent conductive heat loss from the sensor wire through surrounding gas. The controller may then apply a power input to the sensor wire to heat the sensor wire, and measure total power dissipation $W_T$, sensor wire temperature $T_s$, and envelope temperature $T_e$ during the application of the power input. The controller may further determine gas pressure within the envelope based on the measured $W_T$, $T_s$ and $T_e$ and the model of power dissipation.

Thermal conductivity gauge may be a Pirani gauge. The controller may be further configured to 1) at a subsequent time, measure subsequent values of total power dissipation $W_T$, sensor wire temperature $T_s$, and envelope temperature $T_e$ during the application of the power input; and 2) determine a change in at least one of an end loss coefficient G and a radiative loss coefficient E over time based on the subsequent values.

The controller may also be configured to: 1) measure multiple distinct values of the total power dissipation $W_T$ and sensor wire temperature $T_s$ as the power input is varied; 2) determine a mathematical fit for the multiple distinct values of the total power dissipation $W_T$ and sensor wire temperature $T_s$; and 3) determine values of an end loss coefficient G and a radiative loss coefficient E based on the mathematical fit. The envelope temperature Te may be maintained at a constant value as the power input is varied. The controller may be further configured to output a notification to remove and replace the sensor wire based on a comparison of at least one of the end loss coefficient G and the radiative loss coefficient E against a reference value. The controller may be further configured to 1) determine a gas accommodation coefficient A based on the mathematical fit, the gas accommodation coefficient A being dependent on a type of gas in the enclosure; and 2) determine the measure of gas pressure within the enclosure based on the gas accommodation coefficient A.

The controller may be further configured to 1) determine a heat capacity of the sensor wire $C_S$ based on a change in the sensor wire temperature $T_s$ over a given period of time; and 2) determine the measure of gas pressure within the enclosure based on the heat capacity of the sensor wire $C_S$. The controller may determine the heat capacity of the sensor wire $C_S$ based on a rate of cooling of the sensor wire temperature Ts over the given period of time. The controller may determine the measure of gas pressure during an increase of the gas pressure within the enclosure.

Further embodiments include a method of operating a thermal conductivity gauge comprising a sensor wire in a gas volume within an envelope. A model of power dissipation from the thermal conductivity gauge may be provided, the model including power loss due to conductive heat loss from sensor wire end contacts, radiative loss from the sensor wire toward the gas envelope, and pressure dependent conductive heat loss from the sensor wire through surrounding gas. A power input may be applied to the sensor wire, and total power dissipation $W_T$, sensor wire temperature $T_s$, and envelope temperature $T_e$ during the application of the power input may be measured. Gas pressure within the envelope may then be determined based on the measured $W_T$, $T_{s\ and}\ T_e$ and the model of power dissipation.

A zero offset of the thermal conductivity gauge may be modeled by 1) evacuating the envelope to a substantially zero pressure; 2) applying a power input to the sensor wire; 3) measuring total power dissipation $W_T$, sensor wire temperature $T_s$, and envelope temperature $T_e$ during the application of the power input; and 3) determining an end loss coefficient G and a radiative loss coefficient E in the model of power dissipation as a function of $W_T$, $T_s$, and $T_e$. The end loss coefficient G may correspond to heat loss at end posts during application of the power input to the sensor wire, the end posts being coupled to the sensor wire. The radiative loss coefficient E may correspond to radiative loss by the sensor wire during application of the power input to the sensor wire. A temperature compensation value that compensates for variation of at least one of sensor wire temperature and envelope temperature may be determined, the temperature compensation value being a function of at least one of the end loss coefficient G and the radiative loss coefficient E; and the measure of gas pressure based on the temperature compensation value may be determined.

Further embodiments include a method of operating a thermal conductivity gauge. A power input may be applied to a sensor wire of the thermal conductivity gauge when an enclosure housing the sensor wire and an envelope exhibits a substantially zero pressure. Total power dissipation $W_T$, sensor wire temperature $T_s$, and envelope temperature $T_e$ may be measured during the application of the power input. A heat capacity of the sensor wire $C_S$ may be determined based on a change in the sensor wire temperature $T_s$ over a given period of time. A measure of gas pressure may then be determined based on the heat capacity of the sensor wire $C_S$ and a measure of the power input applied to the sensor wire.

Determining the heat capacity of the sensor wire $C_S$ may be based on a rate of cooling of the sensor wire temperature Ts over the given period of time. Determining the measure of gas pressure may occur during an increase of the gas pressure within the enclosure.

Further embodiments include a thermal conductivity gauge comprising an envelope surrounding a gas volume, a sensor wire positioned within the gas volume, and a controller. The controller may be configured to: 1) apply a power input to a sensor wire of the thermal conductivity gauge when an enclosure housing the sensor wire and an envelope exhibits a substantially zero pressure; 2) measure total power dissipation $W_T$, sensor wire temperature $T_s$, and envelope temperature $T_e$ during the application of the power input heating the sensor wire; 3) determine a heat capacity of the sensor wire $C_S$ based on a change in the sensor wire temperature $T_s$ over a given period of time; and 4) determine a measure of gas pressure within the enclosure based on the heat capacity of the sensor wire $C_S$ and a measure of the power input applied to the sensor wire.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. The teachings of all patents, published applications and references cited herein are incorporated by reference in their entirety.

Example embodiments include thermal conductivity gauges, such as Pirani gauges, and methods of operating the same. Conventional Pirani gauges are described below with reference to FIGS. 1-3, and an additional gauge is described below with reference to FIG. 4. Such gauges may be implemented in example embodiments described below with reference to FIGS. 5A-18.

Pirani gauges with constant sensor wire temperature have been employed to perform pressure measurements between 1E-4 and 1000 Torr. Typical Pirani gauges that provide a constant sensor wire temperature during operation rely on a Wheatstone bridge in connection with the sensor wire. The electrical power required to keep the wire at a constant temperature is used to provide a measure of pressure. Maintaining a constant temperature at the sensor wire is desirable as it allows faster response to pressure steps as there is no need to wait for temperature changes to take place. Also, having constant wire temperature provides pressure independent signal baseline offsets that can be subtracted from the actual signal to provide the pure pressure dependent part of the signal by itself.

In a typical constant wire temperature Pirani gauge, the temperature of a wire is kept at a constant temperature by running pressure dependent electrical heating power through it. Since the amount of electrical power needed to keep the wire at a constant temperature depends on pressure, a simple power measurement is used to provide a pressure measurement. This design relies on a Wheatstone bridge to regulate wire temperature by maintaining its temperature dependent resistance during operation.

Figure 1A:
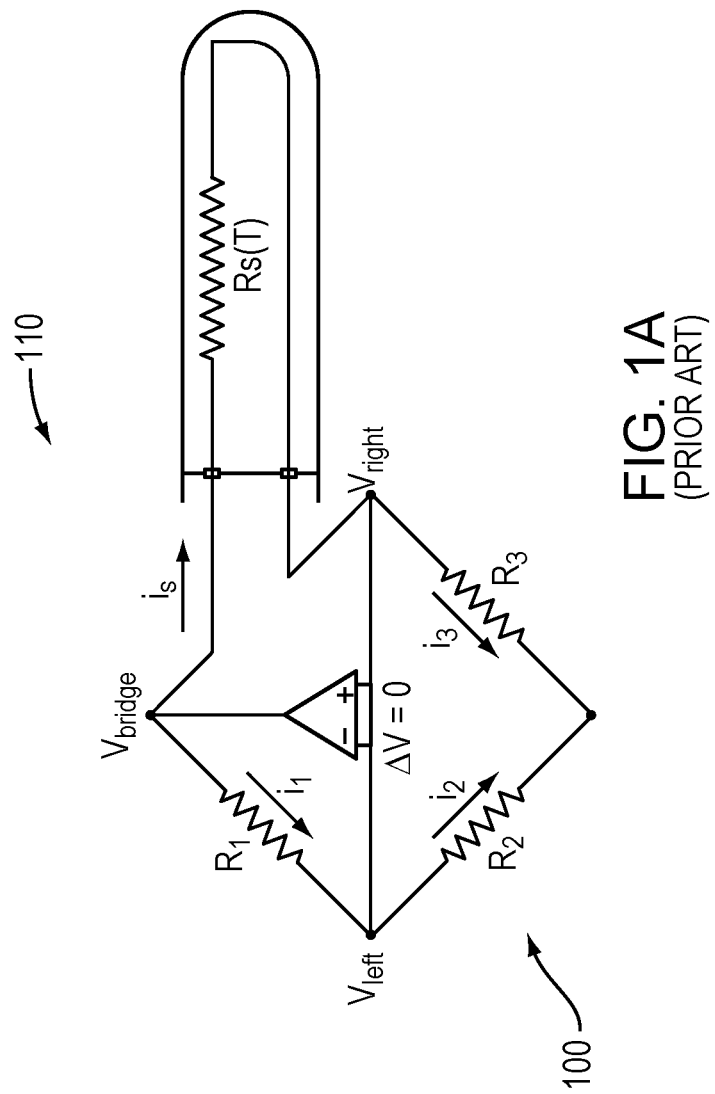
FIG. 1A is a circuit diagram of a prior art Pirani gauge.

FIG. 1A is a circuit diagram of a prior art Pirani gauge 100. The pressure sensor comprises a temperature sensitive resistance $R_S$ connected as one arm of a Wheatstone bridge 110. $R_3$ is typically a temperature sensitive resistance designed to have a negligible temperature rise due to the current $i_3$. $R_2$ and $R_1$ are typically fixed resistances. The sensor wire $R_S$ and typically $R_3$ are exposed to the environment whose pressure is to be measured. The environment is encompassed within an envelope through which the sensor wire $R_S$ extends via a pair of feedthroughs. Alternatively, $R_3$ may also be included within the envelope via an additional one or more feedthroughs.

The resistance values of resistors $R_1$, $R_2$ and $R_3$ are selected such that when a pressure-dependent voltage $V_{Bridge}$ is applied to the top of the bridge, at which $V_{left}=V_{right}$, the resistance of the sensor wire $R_S$ is fixed and identical to $(R_1*R_3)/R_2$. Voltage $V_{Bridge}$ is automatically controlled by an operational amplifier to maintain the voltage difference between $V_{left}$ and $V_{right}$ at zero volts. When the potential drop from $V_{left}$ to $V_{right}$ is zero, the bridge is considered to be balanced. At bridge balance, the following conditions exist:

a) $is=i3$,  (1)

b) $i1=i2$  (2)

c) $isRS=i1R1$,  (3)

d) $i2R2=i3R3$  (4)

e) Dividing Eq. 3 by Eq. 4 and using Eq. 1 and 2 gives f) $RS=\beta R3$(5) where $\beta=R1R2$  (6)

g) Thus, at bridge balance, RS is a constant fraction $\beta$ of R3.

h) To achieve a steady-state condition in RS at any given pressure, Eq. 7 below must be satisfied:

i) Electrical power input to RS=Power radiated by RS+Power lost out ends of RS+Power lost to gas by RS  (7)

Figure 1B:
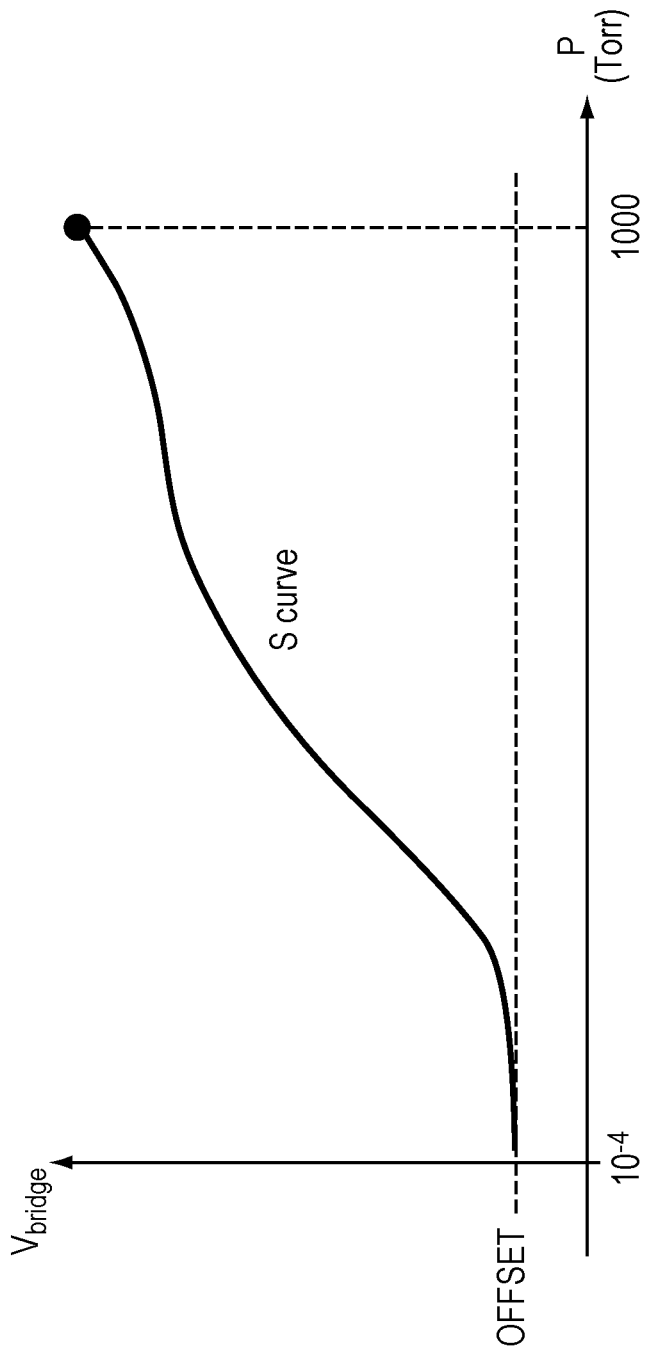
FIG. 1B is a graph illustrating a response of the Pirani gauge of FIG. 1A.

Because the amount of electrical power required to keep the sensor resistor $R_S$ at a constant temperature and a constant resistance increases with pressure, voltage $V_{bridge}$ depends on pressure as well. This relationship is illustrated in FIG. 1B, which is an example plot of voltage $V_{bridge}$ over a range of pressure within a chamber occupied by $R_S$. As shown, the voltage $V_{bridge}$ exhibits an S-curve over the pressure range. A conventional Pirani gauge is calibrated against several known pressures to determine a relationship between unknown pressure, $P_x$, and the power loss to the gas or more conveniently to the bridge voltage. Then, assuming end losses and radiation losses remain constant, the unknown pressure of the gas $P_x$ may be directly determined by the power lost to the gas or related to the bridge voltage at bridge balance.

The Pirani gauge 100 provides a simple configuration for measuring pressure, and allows for adjusting a sensor wire resistance in a simple manner. A simple op-amp circuit can be used to null the bridge ($V_{left}=V_{right}$), allowing the circuit to be built at a low cost. However, in order to provide compensation for different ambient temperatures outside the chamber, resistors of highly specific values must be added to the gauge head during calibration to provide the desired signal response (i.e., $V_{bridge}$ versus pressure) and proper temperature dependence.

Figure 2B:
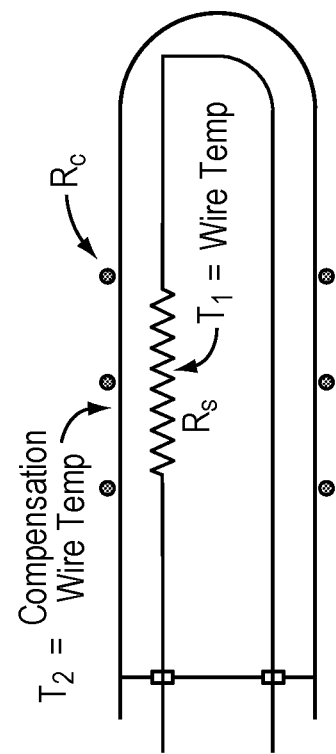
FIGS. 2A-B illustrate a prior art Pirani gauge including a compensation wire.
Figure 2A:
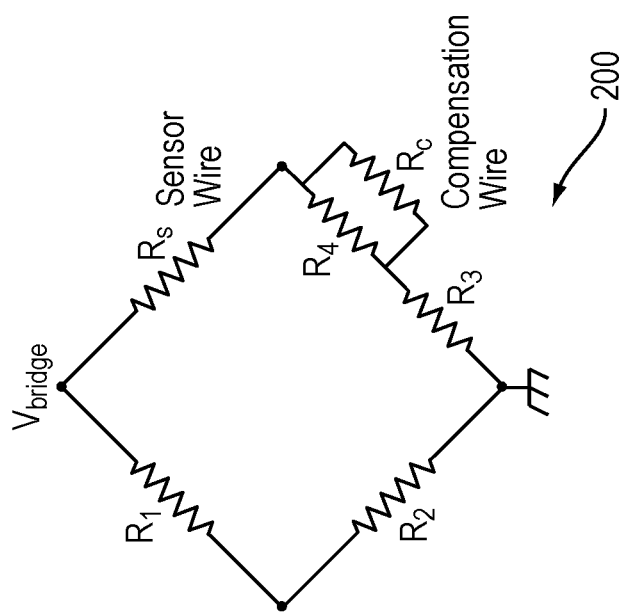

FIGS. 2A-B illustrate a prior art Pirani gauge 200 including a compensation wire Rc. The gauge 200 is comparable to the Pirani gauge 100 described above, but the addition of the compensation wire Rc allows the gauge 200 to compensate pressure readings against ambient temperature fluctuations. Such ambient temperature fluctuations change the difference in temperature between the sensor wire $R_S$ and the envelope walls (not shown) encompassing the chamber in which the pressure is to be measured. As shown in FIG. 2B, the compensation wire resistor $R_C$ is wound around a smaller envelope within the chamber and allowed to reach a temperature $T_2$ having thermal equilibrium with room temperature. The resistances in the bridge ($R_3$ and $R_4$) and in the compensation wire Rc are then tuned such that as $T_2$ changes, and while the Wheatstone bridge remains balanced, the difference in temperature $T_1$-$T_2$ (where $T_1$ is the wire temperature of the sensor $R_S$) remains constant. Because the power dissipated by the sensor wire $R_S$ to the gas depends on this temperature difference, a measurement of this power dissipation indicates a pressure measurement that is independent of ambient temperature.

In practice, the compensation wire $R_C$ exhibits variability among different gauges. Thus, each implementation of the gauge 200 must be individually tuned by adjusting resistance values during testing and calibration to provide a temperature difference ($T_1$-$T_2$) that remains constant as the ambient temperature changes. Further, the winding of the compensation wire $R_c$ can be expensive and difficult to complete. In order to provide fast response, the compensation wire $R_C$ can also be wound internally to the gauge in a thin walled envelope and become exposed to the gas environment.

Figure 3:
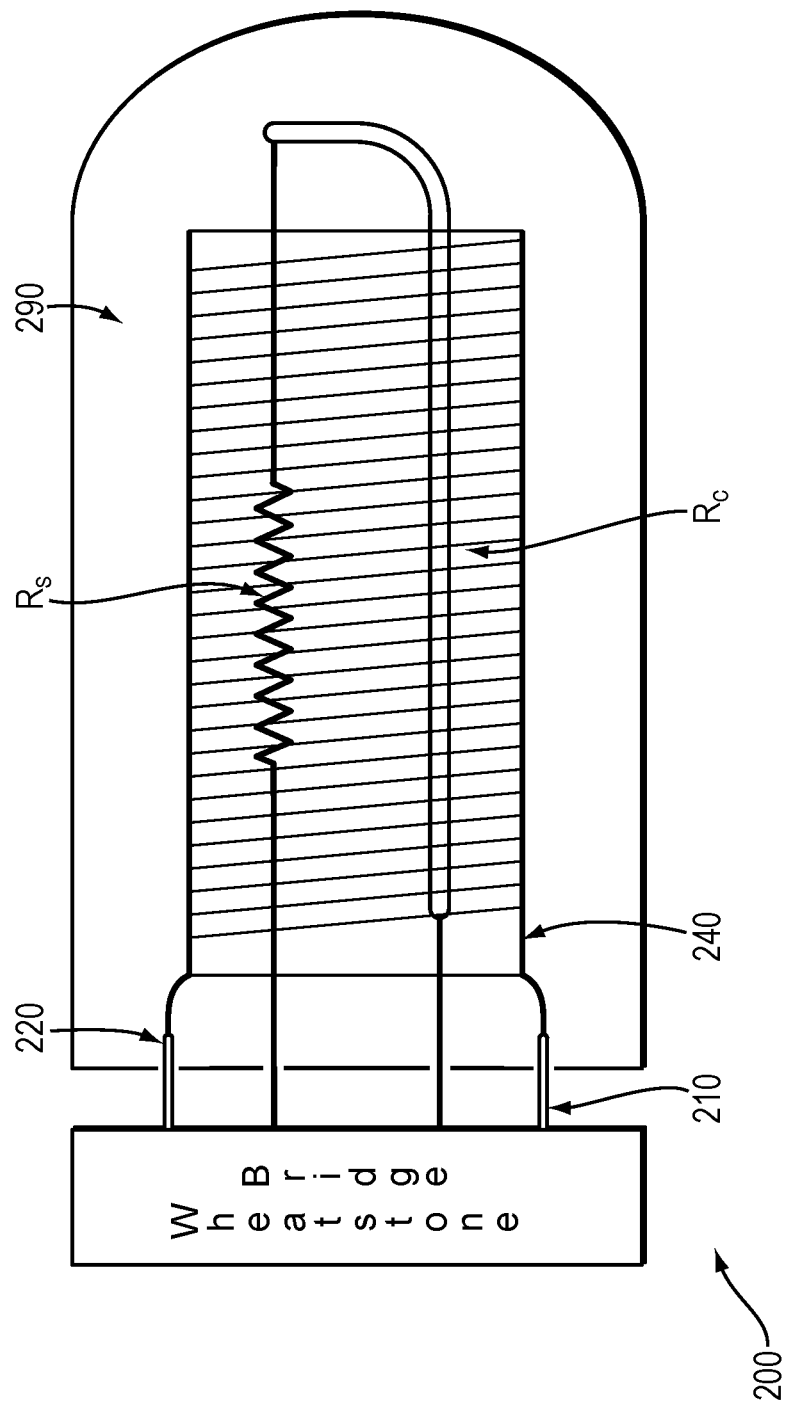
FIG. 3 illustrates the prior art Pirani gauge of FIGS. 2A-B implemented within a chamber.

FIG. 3 illustrates the prior art Pirani gauge 200, described above, in a further view as implemented within a chamber 290 (not shown to scale). A portion of the gauge 200, including the sensor wire $R_S$ and the compensation wire $R_C$, extends into a chamber 290 via a feedthrough flange 220, while the remainder of the Wheatstone bridge remains outside the chamber 290. The compensation wire $R_C$ is mounted inside the pressure sensor volume on a thin-walled can 240 that facilitates stabilization of the compensation wire $R_C$ while the room temperature changes. The gauge 200 requires a minimum of four feedthroughs 210 through the feedthrough flange: two feedthroughs connect the sensor wire $R_S$, and another two feedthroughs connect the compensation wire $R_C$.

The Pirani gauge 200 exhibits several disadvantages. In particular, calibration of the gauge 200 can be difficult and laborious. The gauge 200 must undergo calibration for proper temperature compensation, including selecting the proper resistor values and ensuring that the value $T_1$-$T_2$ remains constant regardless of the room temperature. The Wheatstone bridge requires fine tuning for temperature compensation. Maintaining the value $T_1$-$T_2$ can be achieved if the calibration procedure is properly executed, but it does not allow the use of nominal resistor values. Rather, each gauge must be manually tuned, and is configured with specific resistors that are high-accuracy components.

Due to the rigid implementation of temperature control based on a Wheatstone bridge, the gauge 200 does not allow for a change of the sensor wire operational temperature (or resistance) during operation, instead providing a single temperature of operation.

Even though there is a linear relationship between pressure and the power required to keep the sensor wire $R_S$ at constant temperature, the gauge 200 indicates pressure based on a measurement of the bridge voltage $V_{bridge}$, which, as shown in FIG. 1A, is not linearly related to pressure. The combination of a large baseline offset (due to radiative and end losses, for example) with a non-linear response of $V_{bridge}$ on pressure leads to an S-shaped curve that makes calibration difficult and less accurate while interpolating the measurement results.

Figure 4:
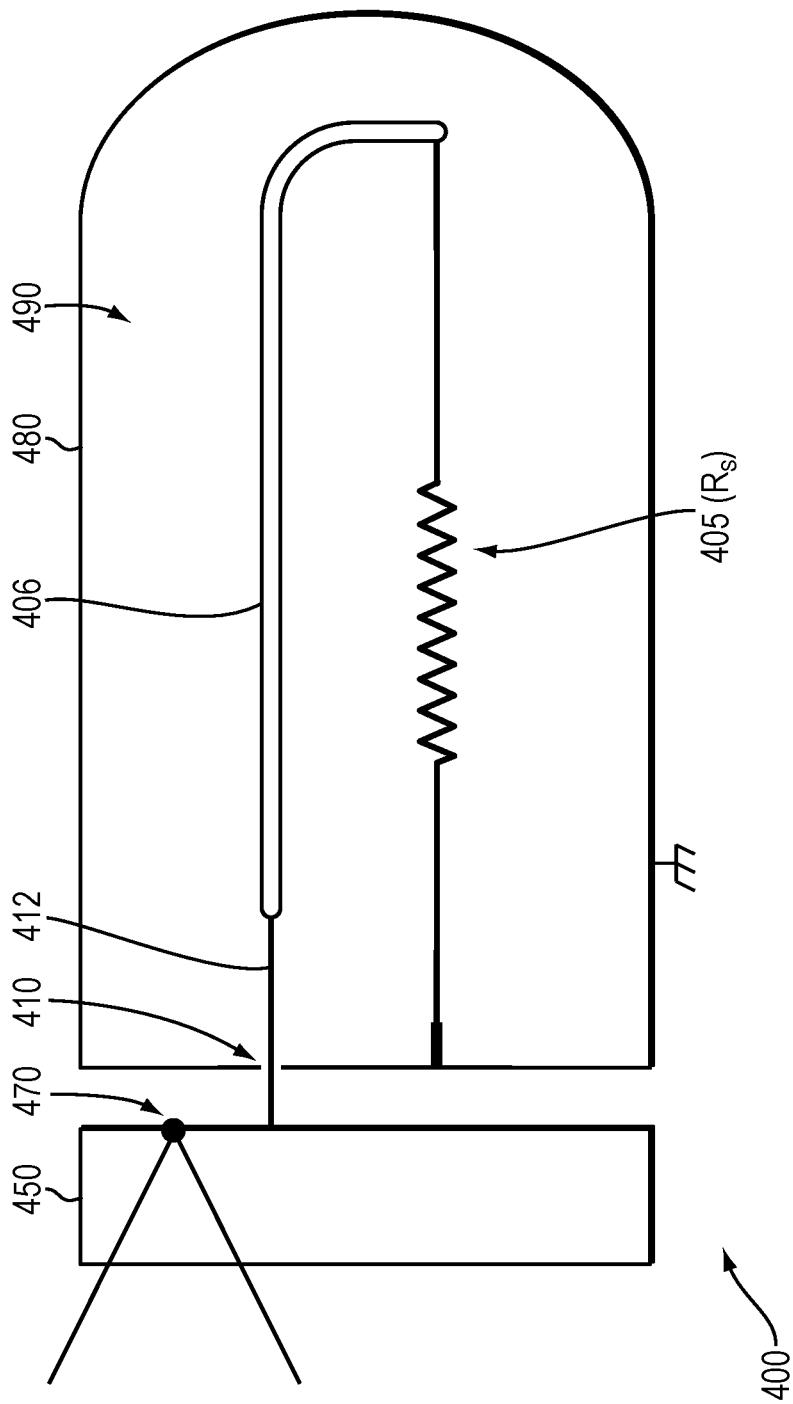
FIG. 4 illustrates a sensor of a prior art thermal conductivity gauge used in an example embodiment.

FIG. 4 illustrates a thermal conductivity gauge 400 in a further embodiment, with attention to a sensor portion of the gauge. The gauge 400 includes a sensor wire $R_S$ 405 (also referred to as a filament) fixed within a chamber 490 via a wire mount 406. The wire 405 connects to a gauge circuit 450 via a terminal 412 that extends into the chamber 490 through a single feedthrough 410 (e.g., electrically connected through an air-to-vacuum feedthrough connection). An opposite node of the wire 405 can be connected to a ground, such as an envelope 480 encompassing the chamber 490. A temperature sensor 470 (e.g., a thermistor) can be positioned at or near the envelope 480 to measure temperature of the envelope 480 and/or ambient temperature outside the chamber 490.

In contrast with the gauge 200 described above with reference to FIGS. 2-3, the gauge 400 provides a sensor having a simpler configuration. The gauge 200 requires only a single feedthrough 410 into the chamber 490. Further, a compensation wire may be omitted from the gauge 400, as temperature compensation can be provided using the temperature sensor 470 in combination with the gauge circuit 450. Thus, the gauge 400 enables a sensor having a simpler, more compact structure that requires less labor to assemble. The gauge 400, as well as further embodiments of thermal conductivity gauges usable in example embodiments, are described in U.S. Pat. No. 10,845,263, the entire teachings of which are incorporated herein by reference.

Many conventional thermal conductivity gauges utilize a Wheatstone Bridge circuit, as described above, to (1) control sensor wire temperatures and (2) access a bridge voltage (Vb) measurand that is related to pressure via a factory-based calibration procedure. Several gauges rely on constant sensor wire temperature and fast analog temperature control for real-time pressure tracking. Although a measurement of bridge voltage is a common calibration path in such gauges, this approach does not provide an opportunity to monitor or track the thermal properties of the sensor during manufacturing and operation. Pirani sensor pressure readings are often sensitive to ambient temperature variations while being expected to operate over wide ambient temperature ranges.

Conventional gauges handle ambient temperature compensation in one of two manners: (1) temperature-sensitive compensation resistors added to the bridge (i.e., during assembly, Vb independent of temperature), or (2) temperature correction coefficients determined during test/calibration in ovenized test vacuum systems (e.g., temperature and/or pressure controlled environments). Typical pressure calibration procedures generate, or simply verify, look-up tables of bridge voltage (Vb) vs. pressure (P) that are then stored in the electronics control units of the gauges/transducers. Sensor wire temperature typically is not included in the calculation of pressure, as wire temperature is controlled but not actively or accurately measured during operation. Envelope temperatures are sometimes used for temperature correction of pressure readings. Calibration coefficients used for temperature correction are typically measured over narrow pressure ranges, in ovenized test vacuum systems during a lengthy procedure, and do not provide adequate temperature compensation over the entire pressure range of commercial sensors as they cannot properly account for the varying heat loss mechanisms that are present throughout the pressure range of operation. Besides changes in envelope temperature due to variation in ambient temperature, self-heating due to higher power dissipation at higher pressures can cause envelopes to operate above ambient temperature as discussed later. Some commercial products focus temperature correction capabilities to minimize the effect of self-heating on pressure display.

Example embodiments, described below, may implement processes to manufacture and/or calibrate a thermal conductivity gauge that improve calibration and operation of the gauge. Such embodiments may implement sensor hardware such as that described above.

Figure 5A:
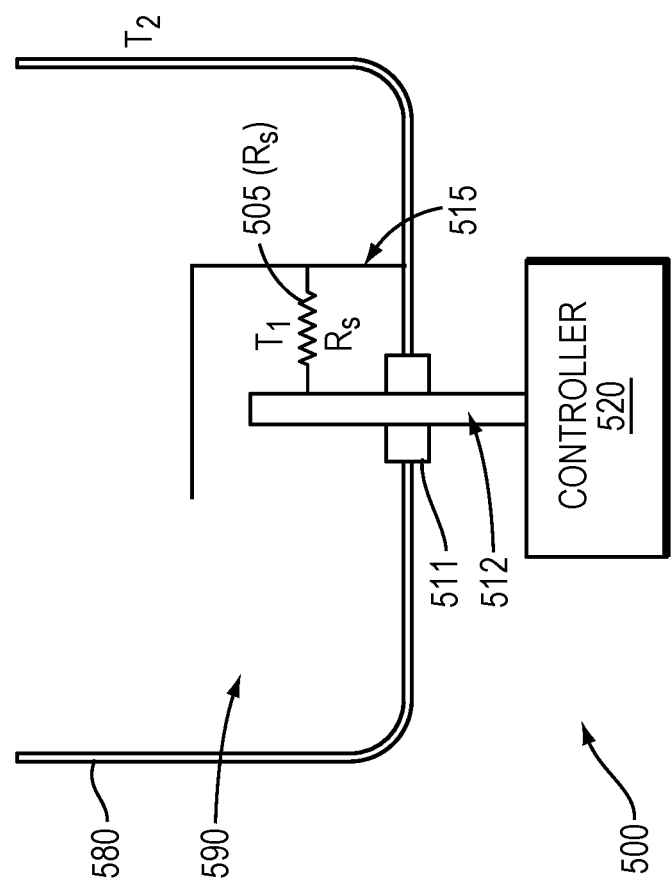
FIG. 5A illustrates the sensor of FIG. 4 in further detail.

FIG. 5A illustrates a thermal conductivity gauge 500 in an example embodiment. The gauge 500 may incorporate features of the thermal gauges disclosed in U.S. Pat. No. 10,845,263, referenced above. A sensor is configured with the optional addition of a shield 515. The sensor wire 505 may be connected between the terminal 512 (embodied as a feedthrough pin) and the shield 515. The shield 515 provides a conductive path to ground, as well as surrounds at least a portion of the sensor wire 505, protecting the sensor wire 505 from physical damage from contaminants from a process environment and providing a thermal boundary condition for the sensor wire 505. The shield 515, when used in combination with a hot cathode gauge, may also serve to shield the sensor wire from the radiation from the hot filament. In such a configuration absent the shield 515, the sensor wire may experience a large change in the baseline radiation offset. An insulator 511 may surround the terminal 512 at the feedthrough 510 to ensure a seal within the chamber 590 encompassed by an envelope 580. The terminal 512 further connects to a controller 550.

Figure 5B:
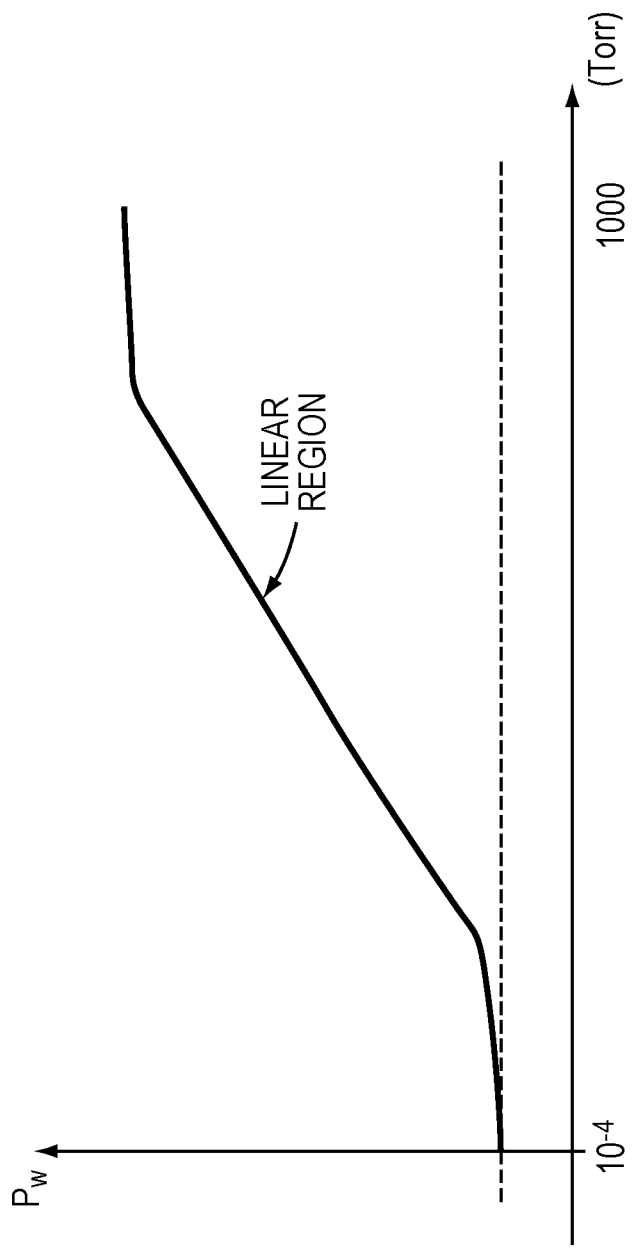
FIG. 5B is a graph illustrating a response of the sensor of FIG. 4.

The sensor wire 505 may be a filament of a small diameter (e.g., 0.001 in. or 0.002 in) and twisted into a coil (e.g., a coil 0.010 in. in diameter diameter). The operational temperature T1 of the sensor wire 505 can be selected to have a target of 20° C. or more above room temperature to provide adequate sensitivity to pressure changes. The temperature of the sensor wire 505 can be held at a constant value during operation, which can improve the speed of response to changes in pressure. This constant temperature T1 can be achieved by applying a controlled power input (designated $W_T$ to distinguish from pressure P) at the terminal 512 to bring the sensor wire 505 toward a target resistance value. A relation between the resistance and temperature of the sensor wire 505 can be determined for the sensor wire 505 based on previous measurements of the same wire type. This relation can be used for calibrating the gauge 500. As shown in FIG. 5B, the required power input $W_T$ also varies as a function of the pressure of the chamber 590. This function exhibits a linear region in which the pressure can be measured most accurately. For gauges that use bridge circuits, the bridge may fix the temperature of operation of the wire, and although the temperature might not be measured, it may be assumed to be constant. However, this assumption may not always be true, particularly during pressure transients.

To improve operation and calibration of a thermal conductivity gauge, example embodiments may utilize real-time measurements of multiple measurands, including total power dissipation ($W_T$), sensor wire temperature ($T_s$), and envelope temperature ($T_e$). Heat loss mechanisms in Pirani Sensors are well understood and the applicable thermal models are widely available from the technical literature. However, conventional Pirani gauges have not implemented any such thermal or physical models to improve the manufacturing and measurement capabilities of Pirani gauges. Fabrication, calibration and pressure measurements of thermal conductivity gauges benefit from thermal models in several ways as described below.

Total power dissipation $W_T$ represents the heat transferred from the sensor wire to the surrounding envelope through several mechanisms including: end losses, radiative losses and thermal conductivity of the gas molecules—it is related to gas pressure and parametrized by both sensor wire and envelope temperature. According to well-established thermal models, $W_T$ increases in direct proportion to gas pressure and the difference in temperature between sensor wire and envelope walls. Detailed mathematical equations will be listed below that correlate power dissipation to gas pressure and temperatures. Gas power dissipation ($W_g$) can be isolated from the total power dissipated by the sensor wire during operation, and based on the well-known thermophysical properties of heated sensor wires immersed in a gas. Gas power losses are directly proportional to the thermal conductivity of the gas, and proportional to gas pressure. Pressure calculation accuracy, and temperature compensation efficacy, improve when gas power losses are known. Pirani sensors are also described as thermal conductivity sensors that provide an indirect measurement of pressure—i.e. dependent on the chemical composition of the gas. The ability to mathematically isolate $W_g$ from $W_T$ simplifies pressure calculation, improves temperature correction algorithms, provides the ability to calculate pressure for other gases (i.e., gases different from the calibration gas) and provides a path for predictive maintenance.

Sensor wire temperature $T_s$ may be measured based on a measured resistance across the sensor wire, represents the temperature of operation of the sensor wire and affects total power dissipation $W_T$ and gas power dissipation $W_g$. Without sensor wire temperature measurement, a Pirani gauge may be unable to distinguish between power changes due to pressure or wire temperature fluctuations. Wire temperature control (analog or digital) is never perfect, and changes in wire temperature can take place at any time due to pressure transients. Real-time sensor wire temperature $T_s$ measurement enables example embodiments to isolate gas power dissipation changes. Sensor wire temperature measurements are also necessary to provide accurate and temperature compensated "zero pressure" power measurements as described below and to derive temperature coefficients without a need for ovenized test vacuum systems.

The power dissipation mechanisms that drive heat loss away from a heated wire are distinct at different pressure ranges. At pressures of less than 10-3 Torr, heat dissipation is dominated by radiation and end losses, as gas conductivity losses are negligible. At a range of 10-3 to 10 Torr, heat transfer is strictly correlated to changes in gas thermal conductivity with pressure. Lastly, at above 10 Torr, heat loss is dominated by gas conduction but is also impacted by increases in gas temperature and convection. Each of these heat loss mechanisms is described in further detail below.

"Zero Pressure" Losses (High Vacuum Range, P<1E-6 Torr)

"Zero pressure," as used herein, refers to an absence of gas density detectable by the thermal conductivity gauge. In the absence of detectable gas density, heat dissipation away from the sensor wire is dominated by two independent mechanisms: end losses and radiative losses. At high vacuum levels, the total power loss, $W_T$, may be expressed as:

$$W_T = W_{end} + W_{rad} \quad (8)$$

Where:
$W_{end}$=Power dissipated to end support posts (i.e., end losses), and
$W_{rad}$=Power dissipated radiatively (i.e., radiative losses).

The end support posts may refer to the support posts directly connected to each end of the sensor wire (e.g., wire mount 406 as shown in FIG. 4). The relative contribution of $W_{end}$ and $W_{rad}$ in a brand-new sensor is affected by the surface emissivity properties, the bulk heat conductance of the sensor wire, the dimensions of the wire (e.g., length and diameter), the temperature of operation of the wire, and the temperature of operation of the envelope.

Figure 6:
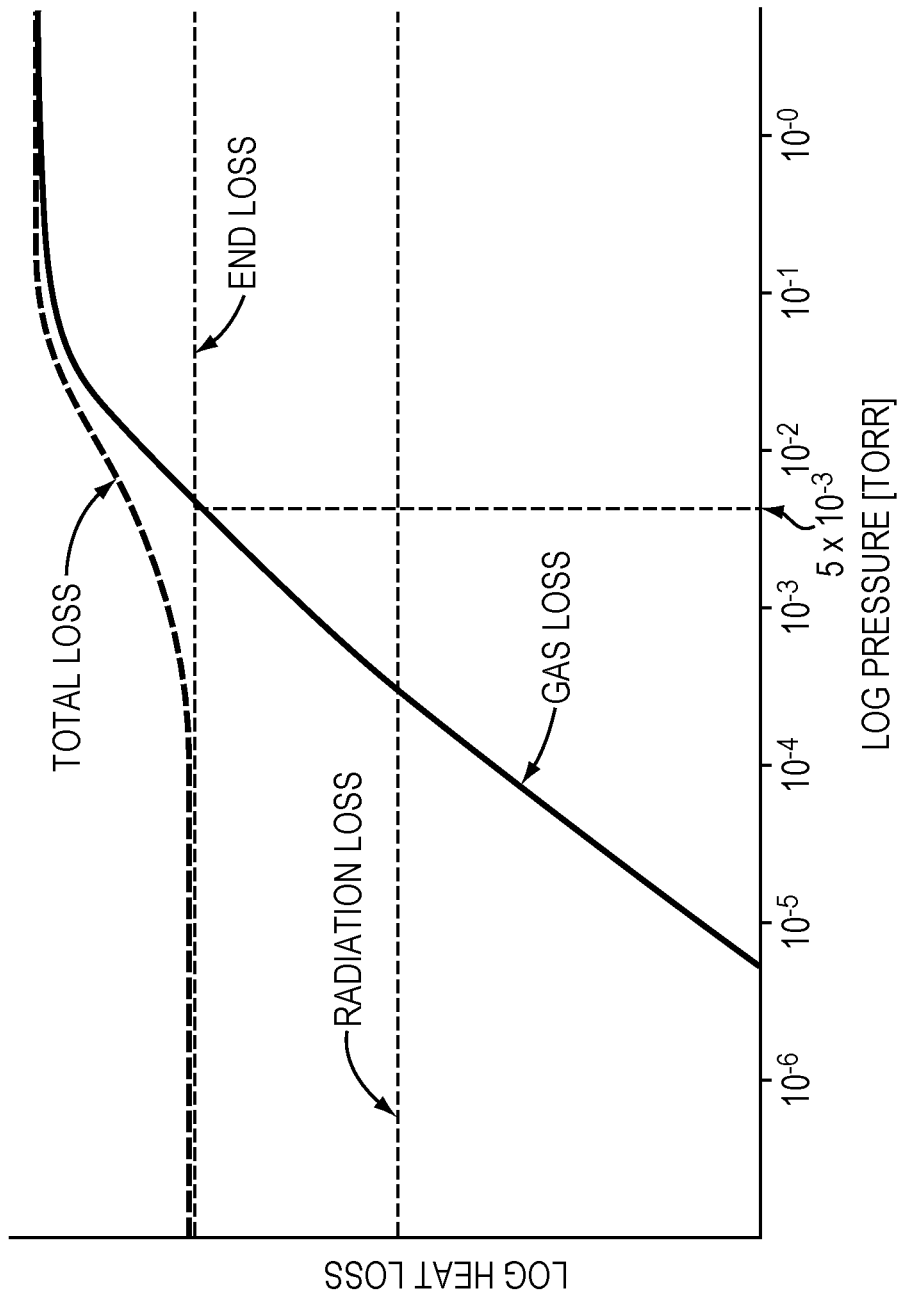
FIG. 6 is a plot illustrating the contribution of "zero pressure" losses to the overall heat dissipation in a sensor in one embodiment.

FIG. 6 is a plot illustrating the contribution of zero pressure losses to the overall heat dissipation in an example sensor. The plot highlights the observation that zero pressure losses are typically dominated by end losses at the normal reference temperature of operation of the sensor wire (i.e. $T_{ref} \approx 100°$ C., typ.), with a lower contribution from radiation, provided that the sensor wire remains clean and polished. Because the radiative loss contribution to zero pressure loss increases with $T_s^4$, radiative losses can be expected to gain relative to end losses (increasing with $T_s$) as the sensor wire temperature increases.

End Losses: $W_{end}$

The end posts are thermally sunk to the sensor envelope and remain close to ambient temperature $T_{amb}$ during operation. As a result, a constant flux of heat power transfer, $W_{end}$, from the wire to the posts takes place. The end posts are thermal anchors, with large heat capacity (or thermal mass) and thermal conductivity to the envelope. Heat drained to the ends is replenished by an electrical heater circuit to maintain a constant wire temperature (e.g., and constant resistance, Rs, value).

In a thermal model, end losses may be represented mathematically as:

$$W_{end} = G^*(T_s - T_e) \quad (9)$$

Where:
G=End Loss Coefficient (ELC)
$T_s$=Temperature of the wire (derived from $R_s$)
$T_e$=Envelope Temperature A distinction between ambient temperature, $T_{amb}$, and envelope temperature, $T_e$, is introduced in equation (9) as it is possible for the temperature of the envelope (to which the sensor wire is thermally sunk) to increase above ambient when self-heating sets in at highest pressures. $T_e$ will continue to be used throughout the thermal analysis to account for possible discrepancies between envelope and ambient temperature caused by self-heating.

The above functional form indicates that a linear relationship between $W_T$ and $T_s$ at high vacuum is indicative of the total heat dissipation being dominated by end losses. ELC may be a function of: 1) sensor wire materials (substrate wire and coating), 2) sensor wire dimensions, 3) support post dimensions, 4) support post materials, 5) post thermal connection to the header, and 6) notch characteristics. ELC (G) may be expected to remain fairly constant provided the mechanical characteristics of the sensor do not change with time (i.e., material is not consumed or built up). ELC may also be also expected to be reproducible unit-to-unit.

Radiative Losses: $W_{rad}$

A heated sensor emits electromagnetic radiation to its surrounding structures (Black Body emission). The rate of energy loss due to such process is related to 1) the temperature of the wire (non-uniform distribution), 2) the emissivity of the wire's surface material, and 3) the temperature of the surrounding structures (roughly $T_e$). In a thermal model, radiative losses can be represented mathematically as:

$$W_{rad} = E^*(T_s^4 - T_e^4) \quad (10)$$

Where:
E=Radiative Loss Coefficient (RLC)
$T_{ref}$=Reference temperature of the wire (derived from Rs)
$T_e$=Envelope Temperature The above equation indicates a non-linear relationship between radiative power and temperatures (e.g., absolute temperature). RLC is directly proportional to the area and the emissivity coefficient of the sensor wire surface.

Figure 7:
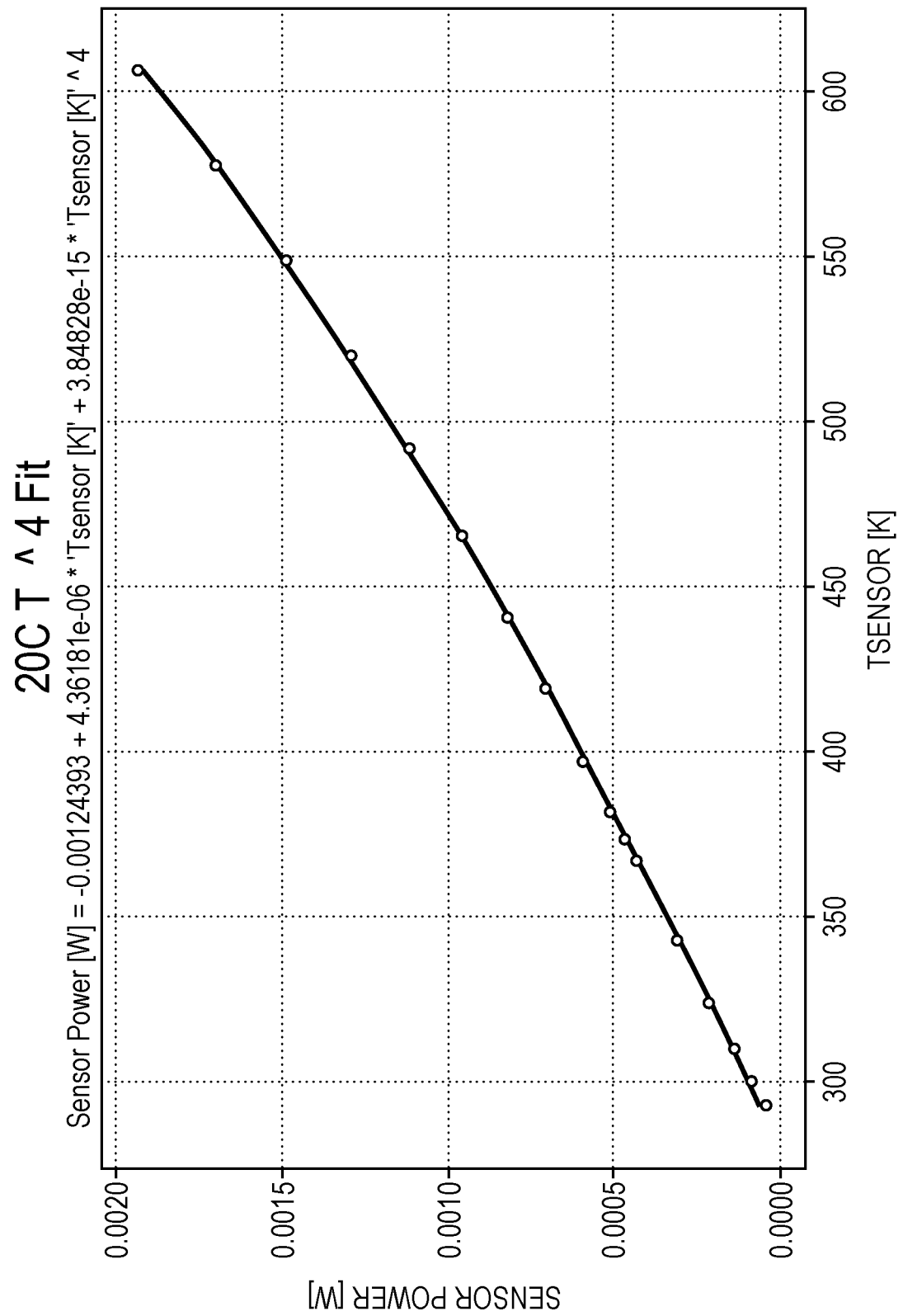
FIG. 7 is a plot depicting power dissipated at zero pressure vs. wire temperature in one embodiment.

FIG. 7 is a plot depicting power dissipated at Zero Pressure vs. $T_s$ for a sensor at $T_e$=20° C. Because $T_s$ reached high temperature values in this experiment, the effect of radiative losses is clearly noticed as an upward increase in slope with increasing $T_s$. Power from the above graph was fitted to the functional form:

$$W_T(\text{Zero Pressure}) = G^*(T_s - T_e) + E^*(T_s^4 - T_e^4) \quad (11)$$

The coefficients derived from a non-linear fit indicated by the trace are shown in Table 1:

TABLE 1

| Dissipation | Coefficient | Value |
| --- | --- | --- |
| End Loss (ELC) | G | 4.36e-06 W/K |
| Radiation (RLC) | E | 3.85e-15 W/K$^4$ |

The measurements and calculations described above provide several advantages. In particular, measurement of $W_T$, $T_s$ and $T_e$ enables the calculation of G and E thermal coefficients for individual gauges during (1) the calibration process or (2) sensor operation (i.e. each time the sensor is operated and stabilized at Zero Pressure). The validity of equation (11) can be verified experimentally and demonstrated that identical values of G and E coefficients are obtained tracking Power variations against either $T_s$ or $T_e$, as depicted equation (11).

Based on equation (11), G and E coefficients can be determined varying $T_s$ or $T_e$ during the manufacturing/calibration process. Pirani circuit implementations, such as example embodiments gauge described below, allow sensor wire temperature changes, and can deliver fresh G and E values in a few seconds (at the factory and in the field). In contrast, the derivation of G and E from Te variations requires ovenized test vacuum systems and is an expensive and time-consuming process. Calculation of G and E, at the factory or in the field, is particularly simple in example embodiments because it allows for variation of sensor wire temperature over a wide range: Total power can be measured at multiple wire temperatures and G and E fitting to the functional form of equation (11) can be calculated, while remaining at high vacuum. In the absence of variable wire temperature capabilities, the measurement of G and E could be realized varying Te in an ovenized test vacuum system, which is a much slower process.

Further, measurement of $W_T$, $T_s$, $T_e$ at Zero Pressure conditions enables the determination of thermal coefficients: G and E, which provides several advantages. In manufacturing of the gauge, determination of G and E at the factory enables real-time incoming material qualification and improves manufacturing yield preventing unacceptable material from entering the production floor. Measurement of end loss and emissivity coefficients may provide a means to establish incoming material inspection procedures and preventative failure reporting in example embodiments. Such embodiments may implement an all-digital power control and power and temperature measurements, or may implement a hybrid configuration that includes an analog temperature controller. Such embodiments may also measure power and temperatures in real time, including configurations having a bridge as described above, which may be accomplished by adding an additional test point to the bridge circuit to measure the current into and voltage across the sensor wire. G and E coefficients can be tracked during production as part of statistical process control (SPC) analysis of incoming material properties.

The measurement also confers operational advantages. Determination of G and E in the field (using variable $T_s$ settings of the sensor), enables detection of sudden increases in E linked to contamination (which affects minimum detectable pressure performance) or sudden changes in G that maybe due to corrosion or contamination buildup on the sensor wire and might point to imminent end of life (and a need for preventative maintenance). G and E coefficients can be tracked during operation to provide predictive maintenance prompts, as described in further detail below. In addition, access to G and E and the ability to upgrade thermal coefficients for a gauge in the field provides an improved zero pressure measurement and minimum detectable pressure (MDP) specification that is less dependent on ambient temperature. Tracking G and E is a substantial feature for improving zero pressure measurement specifications in example embodiments.

Gas Losses

As the gas pressure around the sensor wire starts to increase, gas molecules start to contribute to the total power loss. The total power dissipated is now expressed as:

$$W_T = W_{end} + W_{rad} + W_{gas} \tag{12}$$

Where:
$W_{end}$=Power dissipated to end posts (end losses)
$W_{rad}$=Power dissipated radiatively (radiative losses)
$W_{gas}$=Power dissipated by the gas (gas thermal conductivity losses)

Energy transfer from the heated wire to gas molecules is pressure dependent; it is the effect that is exploited in Thermal Conductivity Gauges (TCG) to derive gas pressure. Because heat transfer to the gas molecules is species dependent (heat capacity, mass and accommodation coefficient), all thermal conductivity gauges are intrinsically indirect pressure measurement sensors. From equation 12, and in order to determine the amount of power transferred to gas molecules, the zero pressure power loss must be well known and subtracted from the total power. Accurate pressure measurements require "knowing" the zero pressure Power loss at all times, which in turn requires knowing G and E for the sensor to adjust to temperature variations of the wire or the envelope. Knowing G and E allows for subtracting zero accurately when either $T_s$ or $T_e$ change.

Figure 8A:
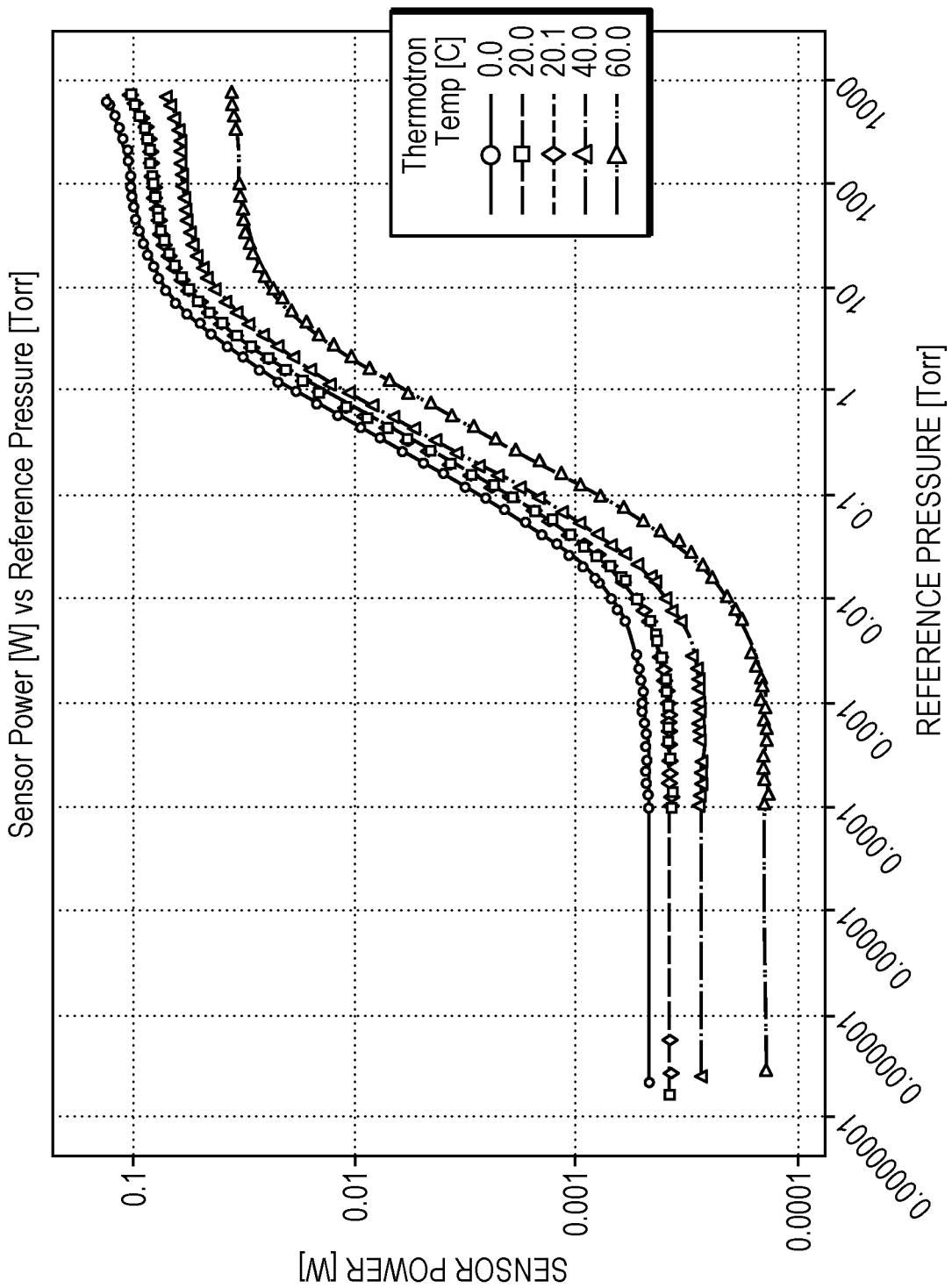
FIGS. 8A-B are plots depicting power consumption at the sensor of a gauge in one embodiment.

FIG. 8A is a plot depicting the power consumption at the sensor for a given gauge, and at several different envelope temperatures between 0 and 60° C., and at $T_{ref}$=100° C. As shown, the power consumption over the entire pressure range diminishes as the envelope temperature increases. It is also clear that the change in power as a function of temperature depends on the pressure range.

Figure 8B:
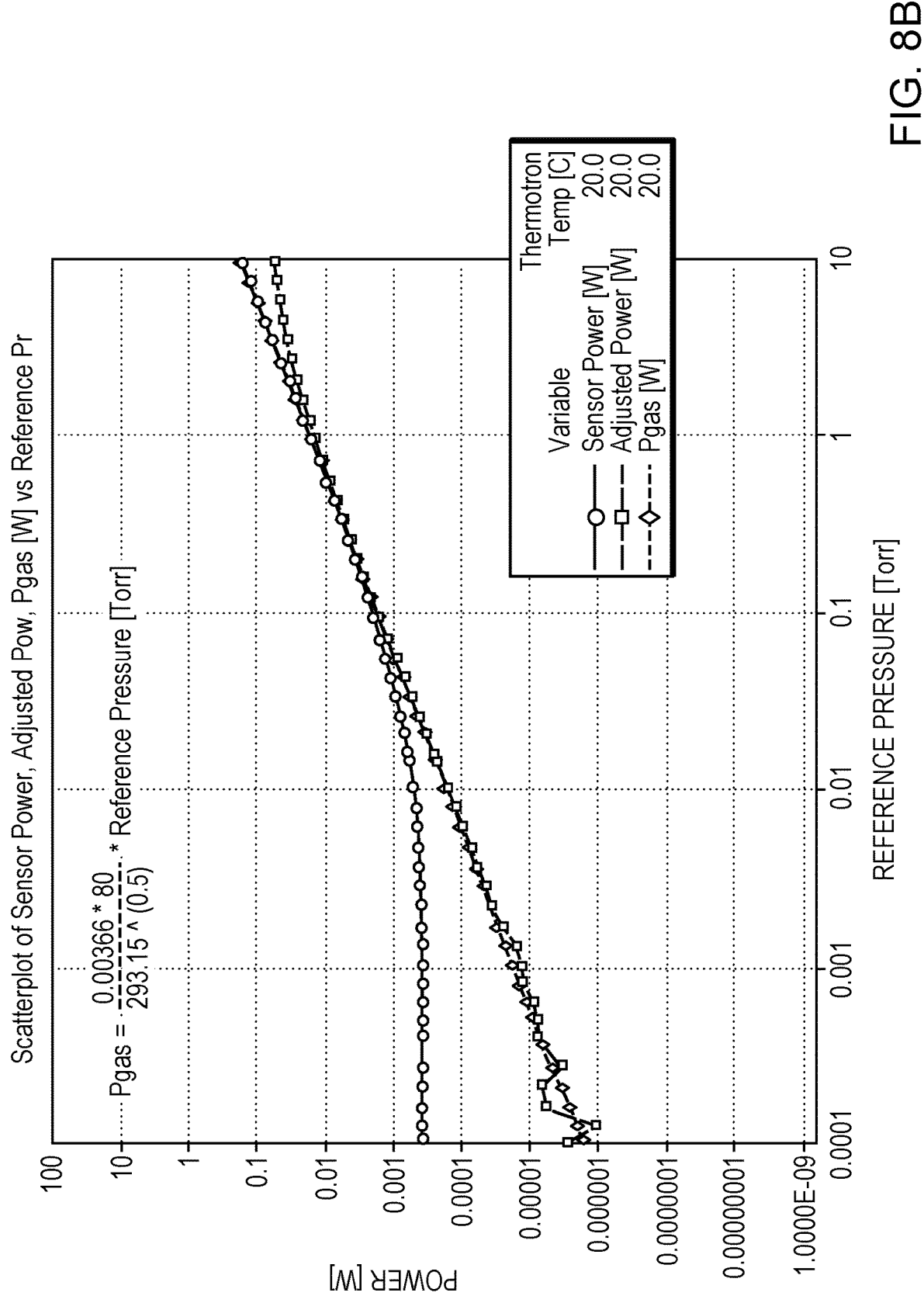

FIG. 8B is a plot depicting power dissipated by the gas $W_{gas}$ as a function of pressure for $T_e$=20° C. The power consumed by the gas is calculated by subtracting the zero pressure $W_T$ from the total pressure data. There is a strict linearity between Gas Power, $W_{gas}$, and P for P<1 Torr and the slope of that linear response is proportionally related to the accommodation coefficient of the gas.

Low Pressure Operation—P≤1 Torr

Figure 9:
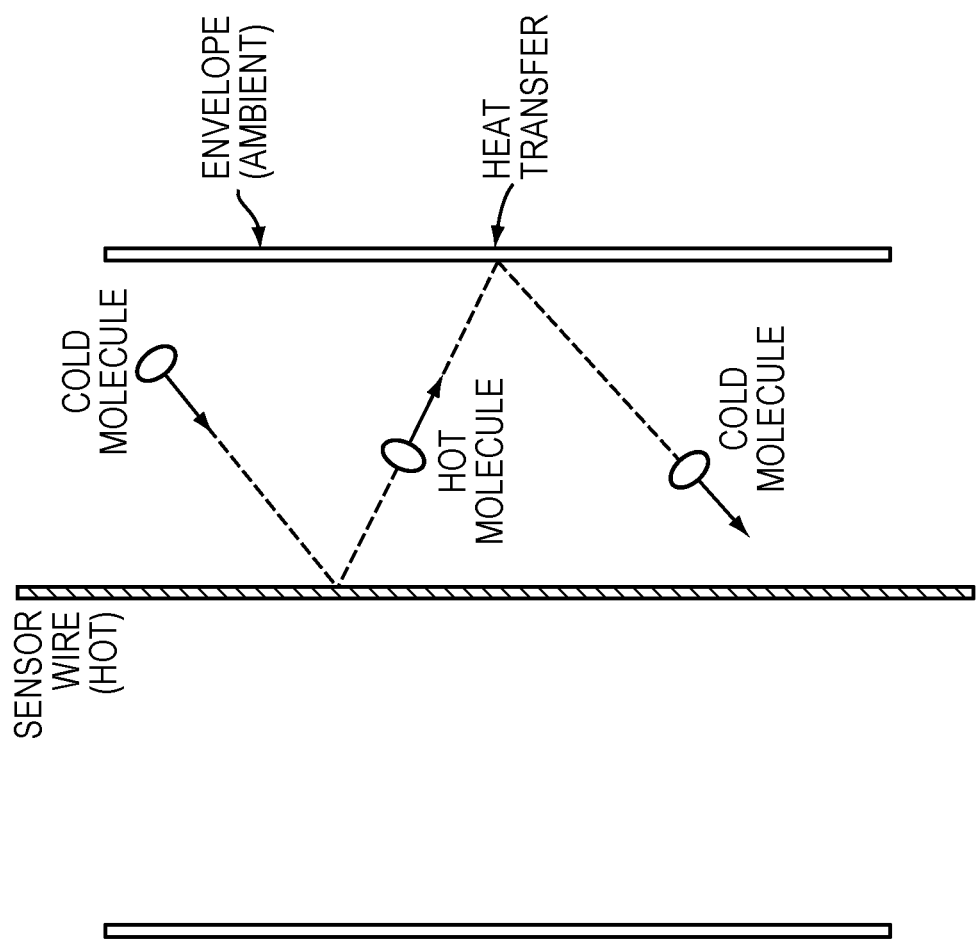
FIG. 9 is a diagram depicting the interaction between a heated sensor wire and gas molecules.

FIG. 9 is a diagram depicting the interaction between a heated sensor wire and gas molecules. At low pressures, gas molecules collide with the hot wire's surface. All molecules arrive with an average temperature $T_g$ (and their corresponding Maxwellian energy distribution). For low pressures (i.e., at which the mean free path for molecular collisions are larger than the characteristic dimensions of the sensor), the temperature of the gas molecules reaching the wire are equilibrated with the envelope temperature, $T_g = T_e$. If self-heating is not in place, $T_e = T_{amb}$. Molecules that reach the wire usually dwell on the surface for a short residence time (related to the accommodation coefficient) and leave the filament with an elevated temperature close to the wire temperature.

An accommodation coefficient is typically defined as the probability of the energy transfer process. At low pressures, the heated molecules ejected from the wire undergo multiple collisions with the envelope walls and their temperature equilibrates back to $T_g = T_e$ before another collision with the sensor wire occurs, energy is effectively transferred from the wire to the wall. The net power transfer is the gas power dissipation.

In a thermal model, the power dissipated by the gas under these low-pressure conditions is represented as:

$$W_g = A^*[(T_s - T_g)/T_g^{1/2}]^*P \tag{13}$$

Where:
$W_g$=power dissipated by the gas molecules
A=Gas Coefficient—species dependent. Includes the accommodation coefficient.
$T_s$=Sensor Wire temperature—reference temperature value.
$T_g$=Temperature of gas molecules reaching the sensor wire.
$T_g = T_{amb} = T_e$ at low pressures (i.e., in the absence of self-heating)
P=Gas Pressure Equation (13) indicates a linear relationship between $W_{gas}$ and P at low gas density values.

Figure 10A:
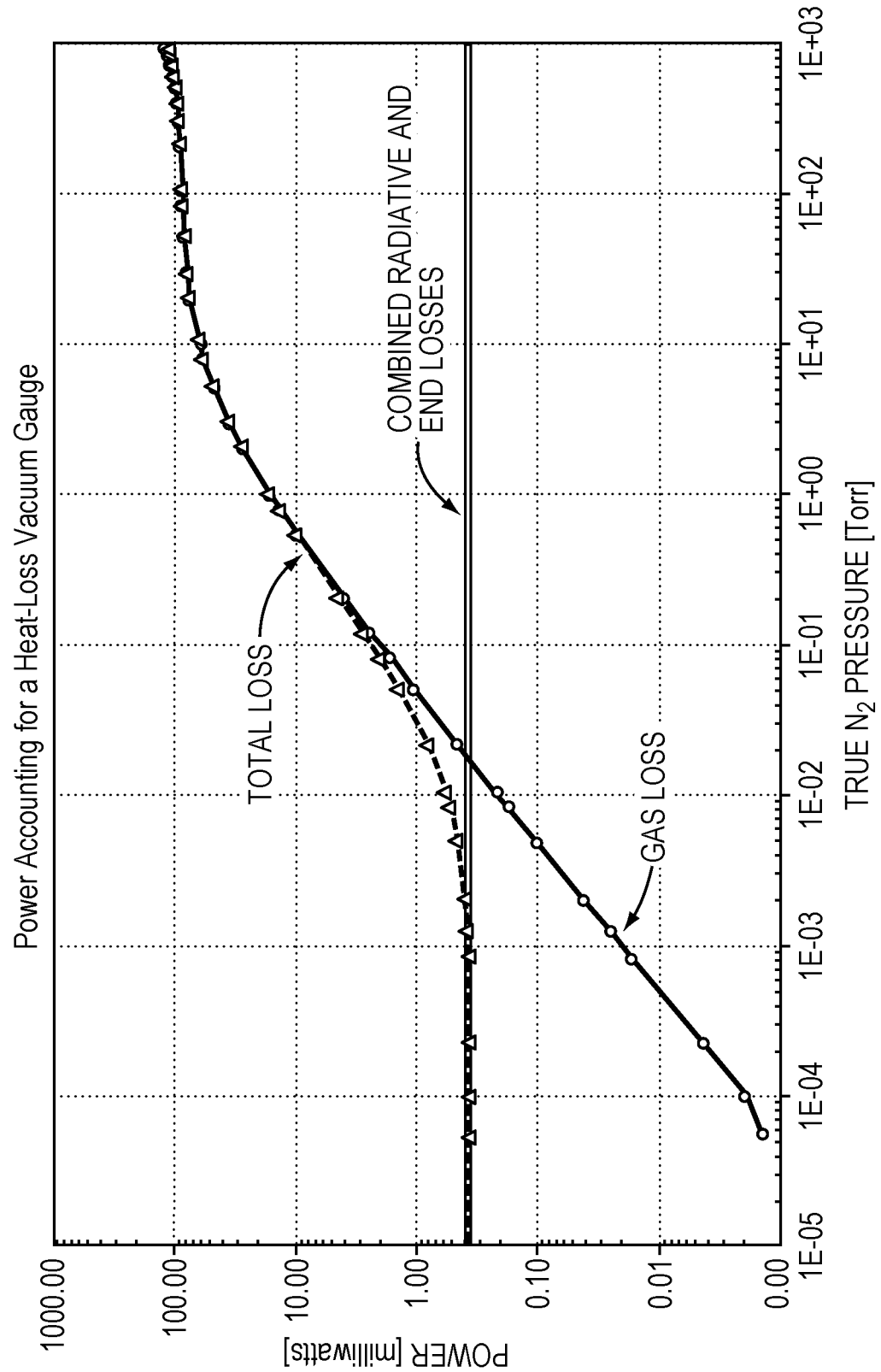
FIGS. 10A-B are plots of power as a function of pressure in once embodiment.
Figure 10B:
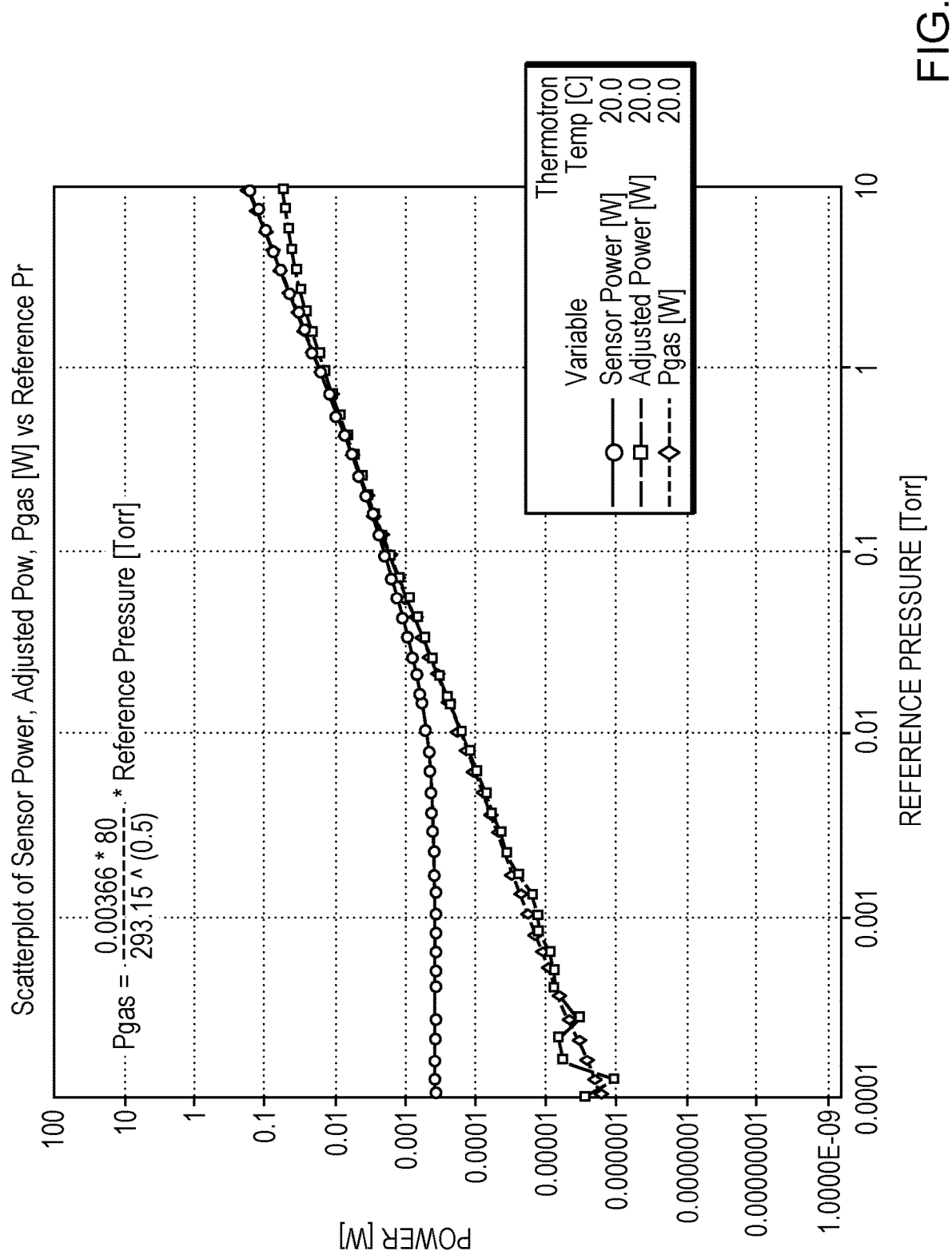

FIG. 10A is a plot demonstrating that the linear relationship of equation (13) is present at pressures <1 Torr in the "gas loss" trace corresponding to $N_2$ gas. FIG. 10B shows a similar relationship via data extracted with a power measurement circuit. The A coefficient can be calculated from the linear region of the plot using equation (13) after measuring: $T_s$, $T_e$ ($=T_{gas}$), and $W_T$. Table 2 shows values of A, calculated from equation (13) using multiple $T_e$ and $T_s$ settings during operation:

TABLE 2

| $T_{ref}$ Constant (373.15K) | |
|---|---|
| $T_e$ [K] | A |
| 273.15 | 0.003515 |
| 293.15 | 0.003448 |
| 303.15 | 0.003494 |
| $T_e$ Constant (293.15K) | |
| $T_{ref}$ [K] | A |
| 343.15 | 0.003637 |
| 363.15 | 0.003682 |
| 373.15 | 0.003499 |
| 383.15 | 0.003621 |
| 403.15 | 0.003553 |

Consistent A values can be calculated and can be used to calculate $W_g$ in the linear region, using equation (13), under typical combinations of $T_s$ and $T_e$.

Thus, measurement of ($W_T$, $T_s$, $T_e$) at zero pressure conditions enables the determination of the thermal coefficient A (also referred to as the gas accommodation coefficient). This determination can provide several advantages. For example, measuring A during manufacturing can provide a measure of the accommodation coefficient of the sensor wire for $N_2$ gas. Monitoring A coefficients can become a part of the incoming material qualification process and prevent unsuitable material (e.g., dirty or bad surface quality) from entering the production floor, particularly for use as sensor wires. In calibration of a gauge, a consistent A coefficient, valid for a wide range of pressure and temperatures, makes it possible to calculate low pressures, over a wide pressure range (e.g., <1 Torr), using ($W_T$, $T_e$, $T_s$) and from a single A value stored in the electronics control module. The A coefficient can be calculated from a single test pressure measurement eliminating the need to use multiple pressure setpoints (e.g., a cycle time reduction). Low pressure calibration and measurement can be simplified when A coefficients are available.

Further improvements are realized during measurement processes. For example, using equation (13), it is possible to calculate temperature compensated pressures using a single, stored A coefficient, total power and the measured temperatures, $T_e$ and $T_s$. Equations (11) and (13) provide specific temperature coefficients for both zero pressure power and gas power temperature correction. Relying on the thermal models and their thermal coefficients for all different heat dissipation mechanisms effectively extends the range of temperatures and pressures over which a Pirani sensor can be temperature corrected. The temperature coefficients utilized are linked to verifiable physical phenomena and provide additional insight into the quality of the manufacturing materials and their health.

Example embodiments, described herein, provide for manufacturing, calibration, operational and pressure measurement improvements that can be derived from the measurement of ($W_T$, $T_s$, $T_e$) in thermal conductivity gauges. Based on thermal models for gas thermal conductivity as described above, example embodiments can characterize thermal properties of the gauge and provide faster and simpler calibration procedures, more accurate pressure measurement algorithms, wider range temperature correction of pressure readings and improved tracking of sudden pressure transients (e.g., steps and pulses).

The measurement of envelope temperature, $T_e$, can be performed with a variety of thermometers thermally linked to the envelope walls. Thermistors, temperature diodes, platinum resistors are some examples of thermometers compatible with the application. The thermometer can be located on the vacuum or air side of the envelope. The measurement of the electrical heating power delivered to the sensor can be achieved in a number of ways through various circuit implementations.

Figure 11:
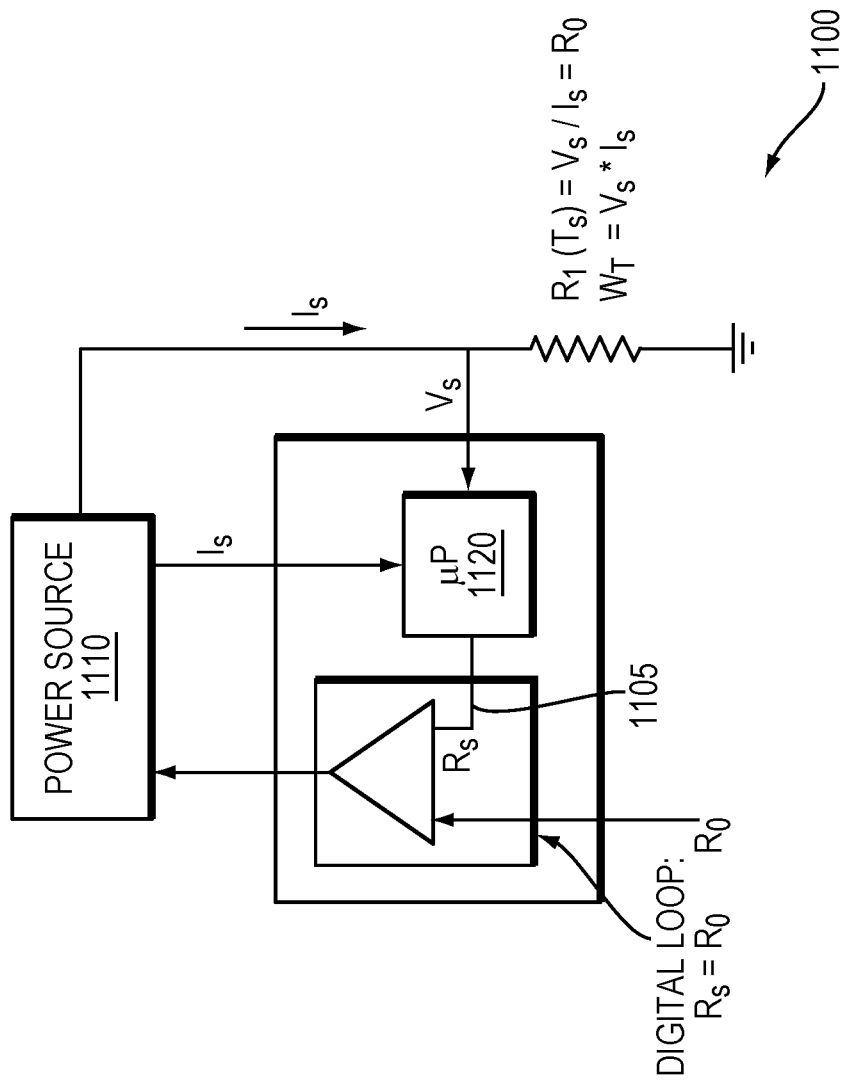
FIG. 11 is a block diagram of a gauge circuit in one embodiment.

FIG. 11 is a block diagram of a gauge circuit 1100 that may be implemented in a thermal conductivity gauge in example embodiments. Here, electrical heating power is delivered to the sensor wire 1105 from a power source 1110, while, through a digital feedback loop, a microprocessor 1120 controls the electrical current ($I_s$) delivered to the sensor wire 1105 to achieve a target sensor resistance, $R_0$. The target resistance, $R_0$, correlates to a desired sensor wire temperature $T_s$ and can be changed at any time to dial different temperatures. Digital measurement of the voltage, Vs, across the sensor wire by the microprocessor 1120 provides both sensor wire resistance $R_S$ and total power dissipation because $I_s$ is known by the microprocessor 1120.

In operation, the sensor wire 1105 temperature $T_s$ may be set by selecting a target sensor wire resistance $R_0$ that corresponds to the desired temperature. In contrast to Wheatstone bridge gauge implementations, $T_s$ can be varied during calibration and in the field by the microprocessor 1120 to derive, or verify, thermal coefficients G, E and A. The power source 1110 provides the information necessary for the microprocessor 1120 to calculate $W_T$, through $I_s$. Digital measurement of the voltage across the sensor wire 1105 provides both total power and wire resistance. Wire resistance can then be fed back to the temperature control loop and the resistance error signal used to close the loop. The temperature control loop may be fully digital, handled by the microprocessor 1120. Voltage measurement may be digital, and may employ fast analog-to-digital converters with high resolution at the microprocessor 1120.

Turning again to FIG. 5A, the controller 520 may implement some or all of the measurement, calculation, and calibration features described above, and may incorporate the gauge circuit 1100 described above with reference to FIG. 11. For example, the envelope 580 may surround the gas volume to be measured, and the sensor wire 515 may be positioned within the gas volume. The controller 520 may be configured to provide a model of power dissipation from the thermal conductivity gauge 500 including power loss due to conductive heat loss from sensor wire end contacts (e.g., $W_{end}$), radiative loss from the sensor wire toward the gas envelope (e.g., $W_{rad}$), and pressure dependent conductive heat loss from the sensor wire through surrounding gas (e.g., $W_{gas}$). The controller 520 may then apply a power input to the sensor wire 515 to heat the sensor wire 515, and measure total power dissipation $W_T$, sensor wire temperature $T_s$, and envelope temperature $T_e$ during the application of the power input. Based on the measured $W_T$, $T_s$ and $T_e$ and the model of power dissipation, the controller 520 may determine the gas pressure within the envelope 580.

To provide predictive maintenance and field calibration, at a subsequent time, the controller 520 may measure subsequent values of total power dissipation $W_T$, sensor wire temperature $T_s$, and envelope temperature $T_e$ during the application of the power input. Based on the subsequent values, the controller 520 may determine a change in at least one of an end loss coefficient G and a radiative loss coefficient E over time.

The controller 520 may also measure multiple distinct values of the total power dissipation $W_T$ and sensor wire temperature $T_s$ as the power input is changed, and then determine a mathematical fit for the multiple distinct values of the total power dissipation $W_T$ and sensor wire temperature $T_s$. Based on the mathematical fit, the controller 520 may determine values of an end loss coefficient G and a radiative loss coefficient E. During this process, the envelope temperature $T_e$ may be maintained at a constant value as the power input is varied. The controller 520 may output a notification to remove and replace the sensor wire (or a larger component of the gauge housing the wire) based on a comparison of at least one of the end loss coefficient G and the radiative loss coefficient E against a reference value. Based on the mathematical fit, the controller may also determine the gas accommodation coefficient A, which may be dependent on a type of gas in the enclosure 580, and then determine the measure of gas pressure within the enclosure 580 based on A.

As described in further detail below, the controller 520 may also determine a heat capacity $C_S$ of the sensor wire based on a change in the sensor wire temperature $T_s$ over a given period of time, and then determine the measure of gas pressure within the enclosure based on the heat capacity $C_S$. The controller 520 may determine the heat capacity $C_S$ based on a rate of cooling of the sensor wire temperature $T_s$ over the given period of time, and may determine the measure of gas pressure during an increase of the gas pressure within the enclosure 580.

When implementing the features described above, a thermal conductivity gauge can exhibit several advantages. Measurement of $W_T$, $T_s$, $T_e$ allows the controller to fully characterize and optimize the gauge based on thermal models. Thermal coefficients, including but not limited to, G, E and A described above can be derived at the factory and updated in the field when the three measurands are available within the gauge.

Thermal coefficients generated at the factory during calibration can have several uses. For example, such thermal coefficients can be used to qualify incoming materials. Factory quality control will be able to set limits on the acceptable values for thermal coefficients, and reject unsuitable material that does not fit within those limits. Such quality control procedures assure the delivery of more consistent product performance to our customers. Conventional sensor wire qualification procedures are often limited to wire resistance measurements that are not adequate to assure the most consistent unit-to-unit performance.

Thermal coefficients can also be used to provide improved minimum detectable pressure (MDP) performance. Pressure measurement at the low end of the range depends on an accurate record of zero offset. Some conventional gauges have tracked a zero offset, but none have the ability to correct the zero offset in real time as sensor wire or ambient temperature change. Zero offset drift limits the MDP specifications of all commercially available products. As a result, users must update their instrument's zero offset routinely, and preferably each time they reach zero pressure (a button press on the unit, a digital signal input or a command) access to G and E coefficients will allow users of gauges to reduce the zero offset checks, as the instrument will be capable to update the zero offset against sensor wire and envelope temperature variations, and based on accepted thermal models for zero pressure power dissipation.

Thermal coefficients may further be used to simplify pressure calibration at low pressures. The ability to isolate gas power dissipation and use the A thermal coefficient to calculate pressure, with physics-based temperature compensation, allows to minimize the number of test points required during calibration at low pressures. Thermal coefficients generated at the factory during calibration can also be used to simplify pressure calculation, with what essentially becomes a single linear equation that accounts for temperature changes of both sensor wire and envelope. Such mathematical implementation allows to easily switch to pressure calculations for other gas species, by simply modifying the A thermal coefficient to match other species being measured.

Further still, thermal coefficients can be used to perform temperature compensation against both sensor wire and envelope temperature variations. The reliance on well-known thermal dissipation models allows to perform improved temperature compensation over a wider range of temperatures and pressures. Such thermal coefficients can also be used to improve the temporal response of Pirani sensors. Conventional sensors generally rely on temperature control loops to nail the sensor wire temperature; however, sensor wire temperatures can deviate from target during events such as pressure steps or pulses. Real time and accurate measurement of sensor wire temperature can detect such deviations from target values and take them into account in the calculation of pressure.

The ability to update the thermal coefficients, originally collected and logged at the factory, while out in the field provides excellent opportunities to detect changes in thermal properties that might point to an end of life or a need for full recalibration or service. The added capability of gauges in example embodiments to change sensor wire temperature over a wide range, combined with access to the measurement of $W_T$, $T_s$, $T_e$ and thermal modelling, provides an additional ability to simplify calibration procedures replacing changes in $T_e$ values, typically performed in slow ovenized vacuum systems, with fast changes in $T_s$ values that can be performed fast and without any need for specialized vacuum systems.

Zero Offset Adjustment

Pirani gauges are workhorse instruments used in the vacuum processing industry to measure gas pressures over a range that typically extends between 1E-4 and 1E3 Torr. In order to assure accuracy at the lowest pressures (i.e., P<1E-2 Torr), it is necessary to perform routine "zero offset" (ZO) adjustments to compensate against drift due to contamination or corrosion of the sensor wire and ambient or sensor wire temperature changes. Zero offset adjustment (ZOA) procedures are typically performed while the gauge is exposed to high vacuum levels (e.g., P<1E-6 Torr).

ZOA can be triggered in the field in several different manners. For example, a "zero" button may be available somewhere on the electronics module. The user presses the button, while at high vacuum, and a new ZO correction value is stored in memory and used for subsequent measurements. A digital input pin may also be available to trigger a ZOA. The logic pin may be linked to a PLC or an ionization gauge that controls the trigger of ZOA events. Alternatively, a ZO command may be available over a digital communication interface. In older gauges without microprocessor control, a potentiometer may be dialed until the pressure readings are properly zeroed at high vacuum. Such ZOA procedures generate a fresh ZO correction value that is stored in the controller's memory and then used to correct all subsequent pressure readings. For accurate operation, ZOA may be essential for all pressure readings P<1E-2 Torr.

ZO drift can be minimized, but it may be impractical to eliminate. Vacuum practitioners are aware of the need to frequently zero their Pirani gauges. Thus, a solution that reduces the frequency of ZOA would provide a substantial advantage. Example embodiments, described below, provide a new ZOA methodology, based on thermal models for heat dissipation, that confers several advantages for thermal conductivity gauges, including:

a) Lower minimum detectable pressure capabilities.
b) Improved accuracy at P<1E-2 Torr.
c) Specific ambient temperature correction of ZO correction values (i.e. reduces the frequency of ZO adjustments).
d) Ability to update zero offset correction temperature coefficients in the field (i.e., lifetime extension), referred to herein as "deep zero offset adjustment" (DZOA).
e) Ability to track changes in sensor wire properties due to corrosion or contamination (i.e., service and predictive maintenance opportunities), leading to lifetime extension.

The physics-based cause for ZO drift is described below, followed by a discussion of how the above improvements can be realized in a thermal conductivity gauge that includes the following features:

a) Calibration and pressure measurement procedures based on thermal models.
b) Access to three necessary and sufficient measurands: total Power dissipation ($W_T$), sensor wire temperature ($T_s$) and envelope temperature ($T_e$).
c) Adoption of temperature coefficients specifically designed for Zero-Offset correction.
d) Novel ZOA options: Standard DOA (updates ZO correction values) and Deep ZOA (updates ZO correction values and its temperature coefficients.

Conventional gauges mostly rely on a Wheatstone bridge circuit implementation, as described above, and use bridge voltage ($V_b$) as the key pressure-related measurand that is related to pressure via calibration. ZO adjustment, in this case, simply measures the bridge voltage at high vacuum, stores that ZO correction voltage in memory, and subtracts that same value from all future bridge voltage measurements. Manufacturers often recommend frequent ZOA events, particularly in more contaminated environments. ZOA is also required to measure accurate pressures at P<1E-2 Torr if the ambient temperature changes by a few degrees.

Most conventional gauges include such ZOA capabilities, but do not measure $W_T$, $T_s$, or $T_e$ as described above. Nor do they use calibration or pressure measurement methods based on thermal models for heat dissipation. Conventional gauges also do not derive or use temperature coefficients specifically calibrated and dedicated to ZO correction values. Some commercial gauges include some level of temperature correction or compensation of pressure readings; however, those approaches are limited to addressing self-heating issues at atmospheric pressures.

Turning back to FIG. 10A, the "total loss" trace demonstrates an S-curve of total power consumption vs. pressure over the typical range of operation of a Pirani sensor. Heat dissipation in Pirani sensors is governed by well-known thermal processes. Equation (12), above, shows the total electrical power consumed by the sensor wire, provided stable pressure and sensor wire temperature. The first two terms $W_{end}$ and $W_{rad}$, are pressure independent, and correspond to end-losses to the supporting posts ($W_{end}$) and radiative losses from the wire to the surrounding (colder) walls ($W_{ra}$). They can be referred to as "zero pressure power losses" and are mathematically related to $T_s$ and $T_e$ via equation 2. $W_{end}$ corresponds to end losses, and $W_{rad}$ term quantifies radiative losses. Both terms depend on $T_s$ and $T_e$ through thermal coefficients: G and E as presented in equation (11) above. $W_T$ (P=0) is the power offset representing the power the sensor wire will dissipate in the absence of gas molecules or gas thermal conductivity to the walls.

By definition, Zero Pressure total power loss, $W_T$(P=0), is pressure independent—it contributes a constant power offset to the total sensor wire power—and adder to the power dissipated to the gas ($W_{gas}$). Zero pressure total power loss is the fundamental root cause for the need for ZOA capabilities in all Pirani sensors.

In FIG. 10A, the "total loss" trace follows the total power consumption including all three terms of equation (12). As shown, the total power curve has a constant power offset: WT(P=0)≈400 mW. Total power rises above that constant offset as the gas pressure increases, noticeably above 1E-3 Torr in the graph. The zero pressure power for the gauge is dependent on several variables: (1) $T_e$, (2) $T_s$, and (3) sensor wire conditions including dimensions and surface finish.

The "gas loss" trace in FIG. 10A is the outcome of subtracting the offset, $W_T$(P=0), from the total power to isolate the power dissipated to the surrounding gas, $W_{gas}$, via thermal conductivity. The linear behavior of $W_{gas}$ vs. P response at pressures below ≈1 Torr provides simple means to calculate pressure (via a linear equation) and execute temperature compensation. In fact, at low pressures, $W_{gas}$ may be expressed as:

$$W_{gas} = W_T - W_T(P=0) = A * P * (T_s(t) - T_e)/T_e^{1/2} \quad (14)$$

Isolating $W_{gas}$ as described above provides a convenient, simple calibration and pressure calculation procedure compared to previous approaches. However, this method relies on keeping constant track of $W_T$(P=0) for the sensor. A change in power offset, not captured with a ZOA, may cause an error in $W_{gas}$ calculation and lead to inaccurate pressure calculation.

It would be advantageous to minimize zero offset contributions to total power. In the example shown in FIG. 10A, the power consumed by the gas (via thermal conductivity) matches the zero pressure power offset at P≈2E-2 Torr. This explains why measurements below 1E-2 Torr generally require accurate and up-to-date tracking of $W_T$(P=0) in order to provide an accurate value of $W_{gas}$ that can then be used to calculate low pressures. In other words, for pressures in the E-4 Torr range, $W_{gas}$ contributes <1% to the total power dissipation, which indicates that an uncorrected drift of 1% in the power offset will be reported as a change in pressure in the order of E-4 Torr.

$W_T$(P=0) must be refreshed periodically using a ZOA procedure, exposing the gauge to high vacuum pressures and recording $W_T$(P=0). However, not all vacuum processes access the required high vacuum levels as often as might be required to provide consistent, accurate low-pressure measurements.

According to equation (14), $W_T$(P=0), is a function of both Ts and Te. Thermal coefficients, G and E, can be determined at the factory as part of the sensor calibration procedure, measuring its dependence on either $T_s$ or $T_e$. Both thermal coefficients can be derived from mathematical fits as described above, stored in memory, and subsequently used to adjust zero pressure power offset against temperature changes. Calculating and storing independent thermal coefficients G and E at the factory, as part of the calibration process, is lacking in conventional approaches and provides not only means to perform temperature correction of the power offset, but also provides a baseline measurement of sensor wire properties including: cleanliness and dimensions.

Example embodiments can implement one or more ZOA processes. In a first, and faster, ZOA process, the gauge is exposed to high vacuum pressure conditions long enough to measure and store in memory the values $W_T(P=0)$, $T_s$ and $T_e$. This is a ZOA process that does not involve any changes in Ts or Te. The thermal coefficients G and E are not updated, but the available records can be used to track changes in $W_T(P=0)$ with $T_e$ and $T_s$ according to equation (14).

In a second, longer process referred to as "deep ZOA," the first ZOA process is carried out as above, and, in addition, the G and E coefficients are refreshed by cycling through several values of $T_s$ and measuring ($W_T(P=0)$, Ts) at a constant Te value, which is also recorded. A mathematical fit of $W_T(P=0)$ vs. $T_s$ (@ constant $T_e$) according to the functional form of equation (14) provides updated values of G and E for the gauge. This update allows users to accomplish two objectives:
  a) Refresh temperature coefficients G and E to continue to provide accurate low-pressure readings after changes occur on the bulk and surface properties of the sensor wire.
  b) Track changes in G and E and report increases that might merit PM replacement of the sensor during the next preventative maintenance cycle of the vacuum chamber. This predictive maintenance capability is not available with conventional gauges.

With a new set of (W(P=0), $T_s$, $T_e$) values, and updated G and E coefficients, example embodiments can continue to track changes in zero pressure offsets with ambient temperature according to equation (14) above. The plot of FIG. 7 shows a curve fit of $W_T(P=0)$ vs $T_s$ leading to updated thermal coefficient values. Table 1, above, shows the coefficients derived from a non-linear fit indicated by the trace in FIG. 7. Thus, the "deep ZOA" process provides fresh G and E coefficients and an opportunity to diagnose end of life issues. In contrast to the first ZOA process that provides a fresh intercept for the zero power, "deep ZOA" provides both the intercept and the slope for zero power vs. temperature.

Changes in G are indicative of changes in the thermal conductivity from the sensor wire to the posts. This suggests changes in dimensions and bulk thermal conductivity due to etching, corrosion or coatings (i.e., contamination). Changes in E suggest changes in emissivity at the sensor wire surface material. This points to changes in surface properties due to etching, corrosion or coatings. Gauge controllers in example embodiments can store acceptable boundaries for G and E values for their sensors and issue service and maintenance prompts if thermal coefficients approach or exceed those limits.

The ZOA solutions described above can provide several advantages. For example, thermal coefficients, G and E, measured during factory calibration and stored in the gauge's memory, specifically for temperature compensation of ZO, provide superior ZO temperature correction. The first ZOA process described above improves upon prior approaches in that 1) it collects and stores the three relevant measurands required to perform real-time temperature correction of ZO: W(P=0), $T_s$, $T_e$, and 2) takes advantage of thermal coefficients G and E to continue performing temperature compensation of ZO. Further, the "deep" ZOA process provides an additional improvement allowing to refresh G and E coefficients, and involves a change to the sensor wire temperature during operation. Updated coefficients effectively extend the lifetime of the gauge, providing consistent temperature compensation of ZO and accurate low pressure readings for a longer time. Deep ZOA also provides opportunities to issue service and predictive maintenance alerts comparing G and E values against recommended limits for the sensor.

Gauge Response Time During Fast Pressure Transients

Conventional Pirani Gauge electronics rely on a Wheatstone Bridge resistor network circuit (see FIG. 1A) to operate a heated sensor wire (or heated element for MEMS devices) at a constant temperature. An analog feedback-loop continuously adjusts the heating power directed to the sensor wire by the electronics and balance the bridge while the sensor wire operates at constant temperature (typically around 100° C.). The bridge circuit regulates the electrical resistance of the sensor wire, which is linked, through factory calibration, to the operational temperature. Bridge voltage, $V_b$, is measured and used to calculate pressure based on a factory-generated (or verified) calibration curve or look-up table. The ability of the balanced resistor bridge to control sensor wire temperature is minimally challenged while the sensor is exposed to fairly constant gas pressure conditions. However, wire temperature can momentarily shift away from nominal if sudden pressure transients (e.g., steps and pulses) occur. The magnitude and duration of the deviation will depend on two factors: 1) the bandwidth of the temperature regulating feedback loop, and 2) the heat capacity of the filament assembly. Prior art Pirani gauges do not monitor wire sensor temperature, but rather assume that temperature is substantially constant. Temperature deviations are not measured or detected in prior art gauges and bridge voltage transients are always treated as induced by pressure changes at assumed constant filament temperature.

Gauges in example embodiment can improve the ability to accurately track fast pressure transients, in real time, conferring a benefit for vacuum processing applications. Common pressure transient events in vacuum chambers are fast vent processes to atmospheric pressure that take place in load locks. During a fast vent, the inrush of gas into the sensor chamber suddenly increases the thermal conductivity from the heated wire to the adjacent walls and drives a sudden decrease in wire temperature that is not detectable in any conventional gauges. The feedback loop responds by delivering additional heating power, for two independent purposes: 1) bringing the filament back to its nominal temperature (i.e., a gas pressure independent contribution), and 2) adjusting heating power delivery to the increased thermal conductivity demands (i.e., a gas pressure dependent contribution). Conventional gauges do not detect the change in wire temperature that takes place during transients, and instead assume that filament temperature is unchanged and that bridge voltage transients are only due to gas thermal conductivity/pressure changes. In other words, the pressure report during transients is not accurate and delayed by the need to restore filament temperature. The response time linked to temperature restoration is related to the power delivery capabilities of the sensor, the bandwidth of the feedback loop and the heat capacity of the sensor assembly. Pirani sensors with smaller heat capacity specifications for the sensor perform better in tracking fast transients. Heat capacity minimization often drives sensor wire design and explains the enhanced dynamic response of MEMS sensors. MEMS sensors have among the smallest Cs values in the industry and are referred by applications where fast pressure transients are experienced. Example embodiments may be compatible with all makes of thermal conductivity sensors, including wire designs and MEMS scale designs. The processes described herein may also apply to sensors in which the controller keeps the hated element at a constant temperature or where the temperature of the heated element depends on pressure. The model works in all those cases.

Example embodiments provide a method for the measurement of pressure with thermal conductivity gauges that is based on thermal models. The temperature of the sensor wire and envelope may be measured at all times, and the electrical power delivered to the sensor wire may be measured as well, while an additional thermal coefficient, representing the heat capacity of the sensor wire, is included in the pressure calculation algorithm to isolate any power directed to restore sensor wire temperature during pressure transients. Inclusion of the contribution of a heat capacity term in the pressure calculation improves the dynamic response of Pirani sensors during the measurement of fast gas pressure events. The amount of power directed to restore sensor wire temperature is proportional to both the sensor wire heat capacity and the rate of change of wire temperature. Fast wire temperature measurement is beneficial to provide a more accurate measurement of heating power driven by heat capacity. Also described are several methods to measure the heat capacity coefficient of the sensor wire. Such methods can be deployed during the manufacturing procedure. Routine measurement of heat capacity on production units provides an additional path for incoming material qualification and to filter unsuitable material away from the production line.

Described above are processes for measurement of total Power ($W_T$), Sensor wire Temperature ($T_s$) and envelope Temperature ($T_e$) combined with a methodology to calibrate and calculate pressure based on thermal models. Below, this solution is extended by including an additional term in the total power equation, which accounts for heating power directed into the sensor to readjust its temperature during pressure transients.

Heat Capacity Correction

The heat capacity of the sensor wire assembly plays a key role in the dynamic response to pressure transients of Pirani Sensors. The heat capacity of the sensor wire assembly is defined as:

$$C_s = Q_T/\Delta T \quad (15)$$

Where, $C_s$=Heat capacity of sensor wire assembly
(e.g. Specific Heat Capacity of Tungsten: 132 J/K Kg)

$Q_T$=the amount of energy required to change $T_s$ by $\Delta T$. The total power consumed by the sensor wire assembly during operation may not only consider the power lost to gas, radiation and end posts, but also power delivered to adjust sudden changes in $T_s$ (i.e., when the regulated sensor wire temperature is compromised). In fact, if $T_s$ (t) is not a constant, the total power, $W_T$ (t), is not a constant even if the gas pressure is fixed, and one must then include power being delivered to correct sensor wire temperature into the total power equation:

$$W_T(t) = W_{end} + W_{rad} + W_{gas} + C_s[dT_s/dt] \quad (16)$$

$$W_T(t) = G^*(T_s(t)-T_s) + E(T_s^4(t)-T_e^4) + A^*P^*(T_s(t)-T_e)T_e^{-1/2} + C_s^*[dT_s/dt] \quad (17)$$

In the above equations, $C_s[dT_s/dt]$ is the additional power term that isolates the heating power expended on wire temperature changes. The amount of energy required to increase the wire temperature by $dT_s$ is: $dQ=C_s^*dT_s$ as represented by equation (15).

Heat capacity of the sensor wire assembly is an important thermal coefficient when considering the dynamic response of a thermal conductivity gauge. The heat capacity includes contributions from the sensor wire's specific heat capacity as well as some additional contribution from the attachment posts. During a pressure transient (e.g., pressure burst), the sensor wire typically cools down momentarily and the feedback loop responds by applying additional heating power to restore its desired temperature. Unless that extra power, related to sensor wire temperature variations, is isolated and taken into consideration in the power equation this will cause an error in the pressure calculation. Conventional Pirani gauges do not track $T_s$, and so they cannot differentiate between gas pressure transients and the resulting wire temperature changes. Heat capacity may be particularly important in the model-based pressure calculations described herein if the sensor wire is not operated at constant temperature, or if the heat capacity is very large or the bandwidth of the heating circuit is very small.

Figure 12:
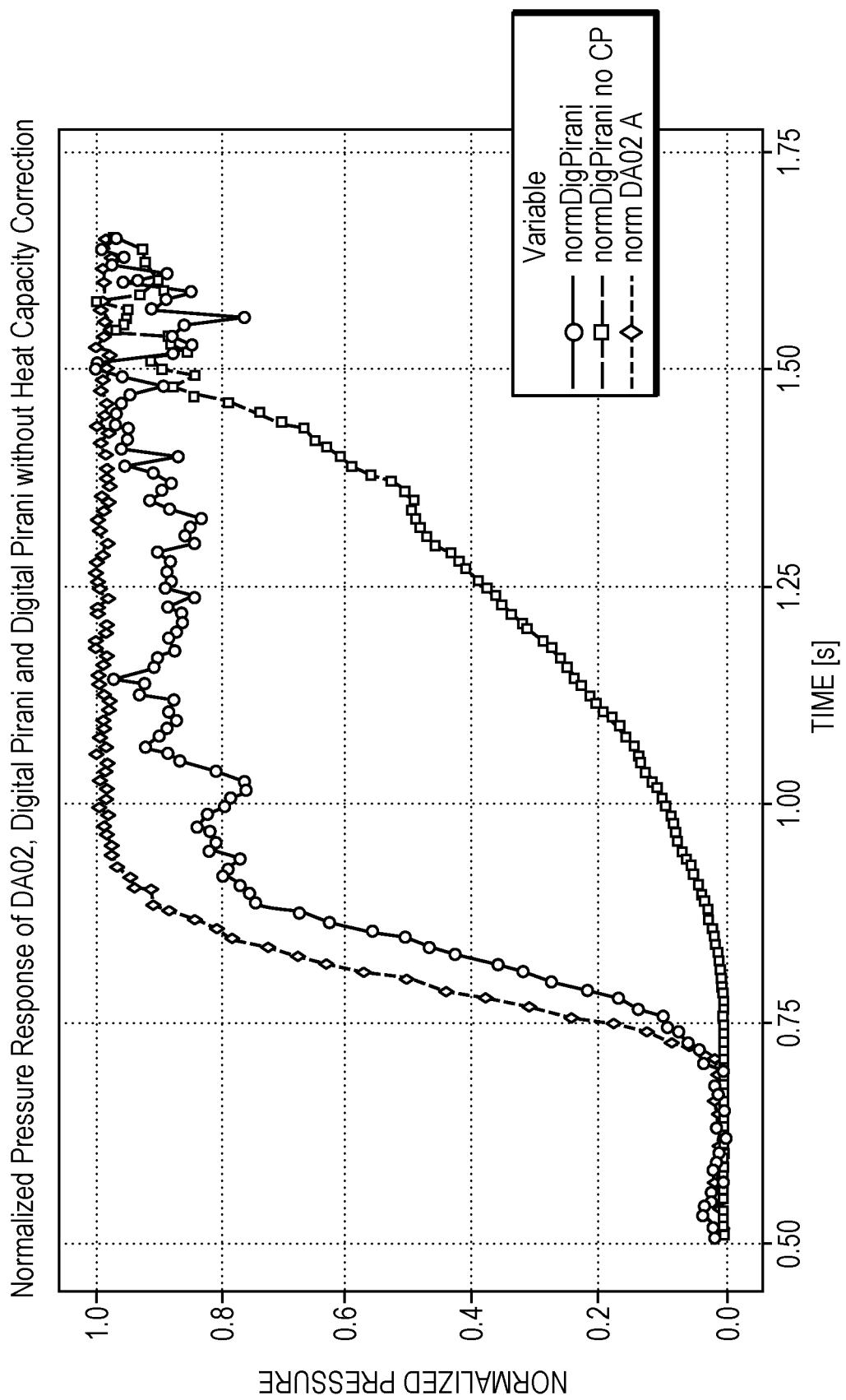
FIG. 12 is a plot of normalized pressure over time in one embodiment.

FIG. 12 is a plot of normalized pressure over time, and shows the improvements in dynamic response that can be achieved in an example gauge once the heat capacity coefficient is incorporated into the pressure calculations above. The diamond trace represents the actual pressure transient as reported by a capacitance manometer. The square trace represents the measured pressure transient without considering the last term in equation (17). The circle trace shows the reported pressure once the full equation is considered as in equation (17). Such gains in temporal response are particularly beneficial for sensors with large heat capacities or low bandwidth heater circuits. The ability to measure fast transients with large heat capacity sensors allows the design of more robust gauges, including additional material (e.g. thicker wires) that can withstand process chemistries and deliver longer lifetimes.

$C_s$ Measurement—Cool Down Time Constant

Heat capacity $C_s$ is important for calculating the time required for the sensor wire to cool down when power is removed. The time required for a sensor wire to cool down after the power is removed is given by the equation:

$$T_s(t) = T_e + (T_{s,nom} - T_e)^* e^{-(a^*t/Cs)} \quad (18)$$

Where:

$T_s$ (t): time varying sensor wire temperature.
$T_e$: final temperature (cool wire)
$T_{s,nom}$: Initial and nominal wire temperature (hot wire)
$C_s$: heat capacity of the sensor wire assembly
a: Heat conductance coefficient: $G+A^*P^*T_e^{-1/2}$ The cool down time of a sensor wire is faster if there is increased heat dissipation (e.g., end losses and gas thermal conductivity) or if the heat capacity diminishes. In fact, the time constant for the cool down process is given by the quantity:

$$T(P) = C_s/a = Cs/(G+A^*P^*T_e^{-1/2}) \quad (19)$$

Equation (19) shows that the cool down time constant as a function of the gas pressure, with the longest time constant manifested at zero pressure conditions.

$C_s$ Measurement—Pressure Rise $C_s$ can be used to determine the time for a sensor wire assembly to achieve a desired temperature under a specified heating power delivery step. As indicated above, the temperature rises exponentially under constant power and the time constant increases with pressure as less power is available for heating the sensor wire.

The first approximation to the heat capacitance of the wire can be determined using the dimensions and specific heat capacity of W material (e.g., length 2 inches, diameter 0.0005 inches, specific heat capacity: 132 J/Kg K, density: 19300 Kg/m$^3$: Cs=1.64E-5 J/K). This number is expected to under-represent the heat capacity of the entire sensor assembly as it is expected that the supports will contribute to the overall heat capacity. Using this calculated number for Cs, and the average G=5E-6 W/K for Zero Pressure conditions, this suggests a time constant of:

$$T(P=0)=1.64E-5/5E-6 \approx 3.3 \text{ seconds.}$$

This suggests that a filament will remain hot for many seconds after power is removed under zero pressure conditions, and the time will decrease in proportion to pressure increases. Conversely, it will take longer to heat up the filament in proportion with higher gas pressure.

$C_s$ Measurement: Calorimetric Determination

A direct way to perform a heat capacity measurement is to perform a calorimetric measurement at zero pressure. In a calorimetric experiment, an electrical heating power step is applied to the sensor wire assembly while tracking its temperature increase vs. time: $T_{ref}(t)$. At each measurement, the power dissipated to thermal conductivity is subtracted from the total power (i.e. end losses are subtracted at zero pressure). The remaining power (used to heat the sensor wire assembly) is then integrated and divided by the temperature increase it causes to provide a direct measurement of the sensor wire heat capacity: $C_s$. At zero pressure:

$$C_s = \int [W_T(t) - G^*(T_s(t) - T_e)] dt/\Delta T_s, \quad (20)$$

If the power $W_T$ is stepped and controlled to a constant value during the heating, the temperature of the sensor wire assembly increases according to the equation:

$$T_s(t) = T_e + (W_T/a)^*(1 - e^{(-t/T)}) \quad (21)$$

Figure 13:
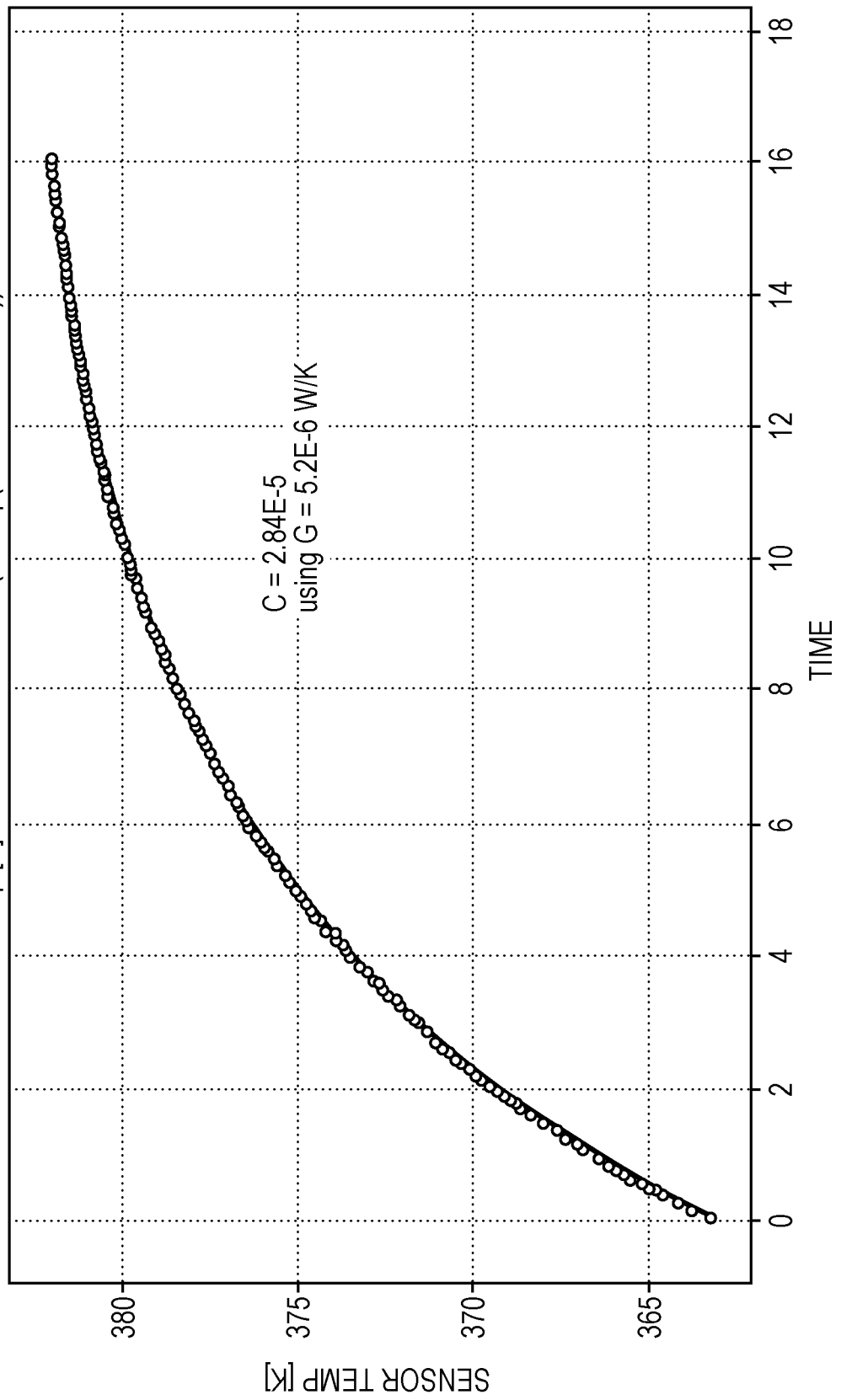
FIGS. 13-14 are plots of sensor temperature over time in one embodiment.

Where:
T=$C_s$/a, time constant for temperature increase
a=Heat conductance coefficient: $G + A^*P^*T_e^{-1/2}$
P=gas pressure FIG. 13 is a plot of sensor wire temperature versus time, and shows the results of a calorimetric experiment in which $T_s$ is increased from 90 to 100° C. with a current (power) step. The sensor starts at 90° C. and the heating current is suddenly stepped up to the value corresponding to a $T_s$=100° C. Since the resistance of the sensor wire does not significantly change at this temperature range, constant power delivery is presumed and the data can be fit to equation (21). This fit shows the following: 1) T=$C_s$/G=5.468 seconds, 2) G=5.2E-6 W/K, and 3) Cs=2.85E-5 J/K. Here, the measured value exceeds the calculated value: 1.64E-5 J/K confirming that heating above ambient extends beyond the sensor wire, i.e. extends into the sensor wire assembly. For this reason, $C_s$ may be referred to as the heat capacity of the sensor wire assembly.

Figure 14:
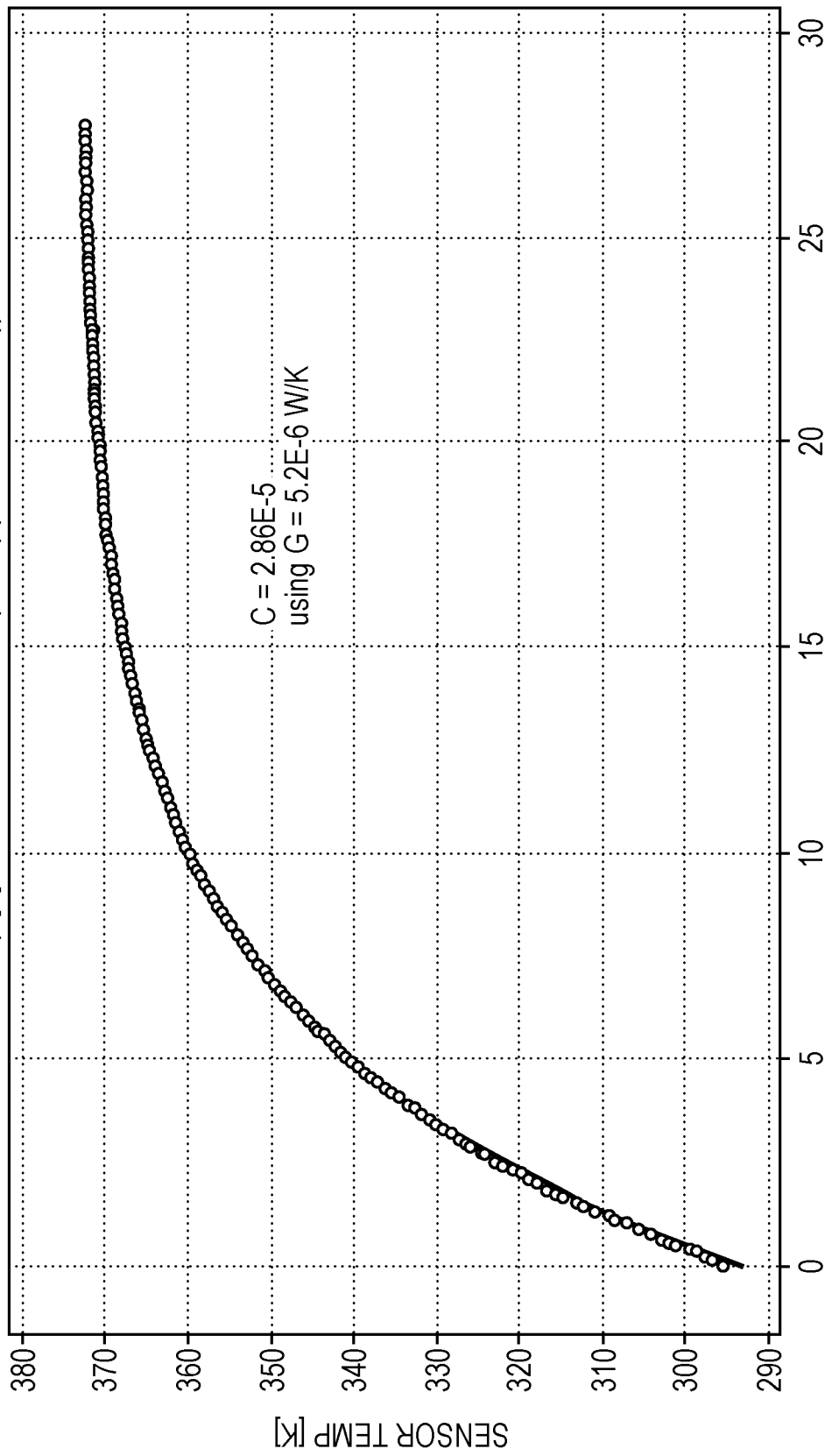
Figure 15A:
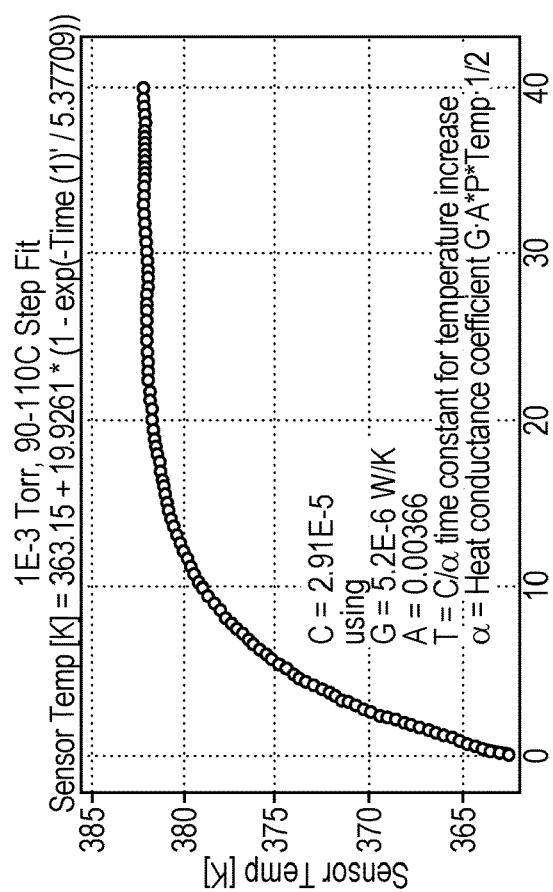
FIGS. 15A-D are plots of sensor temperature over time in a further embodiment.
Figure 15B:
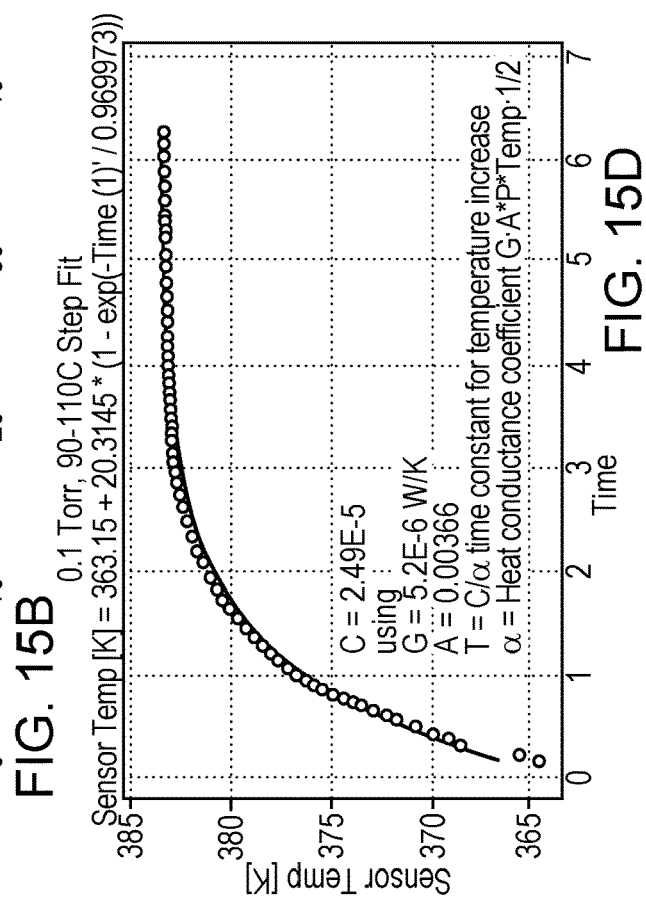
Figure 15C:
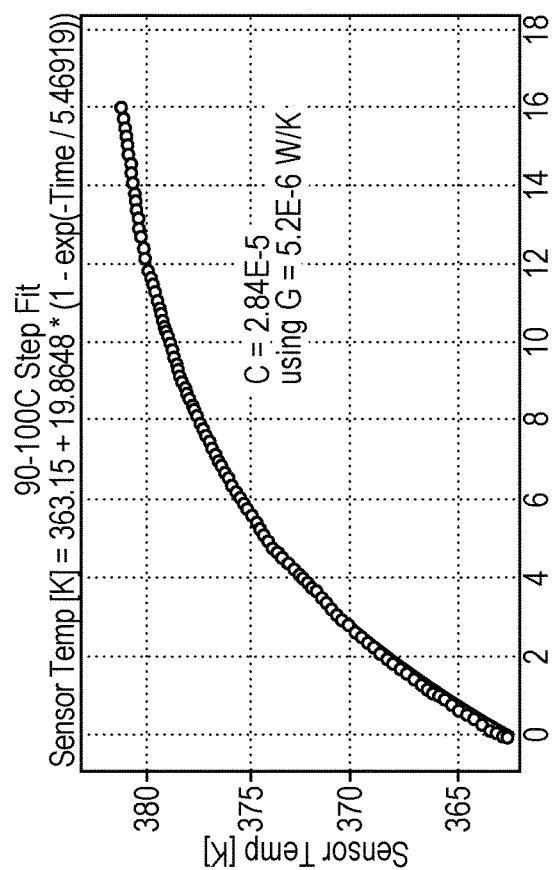
Figure 15D:
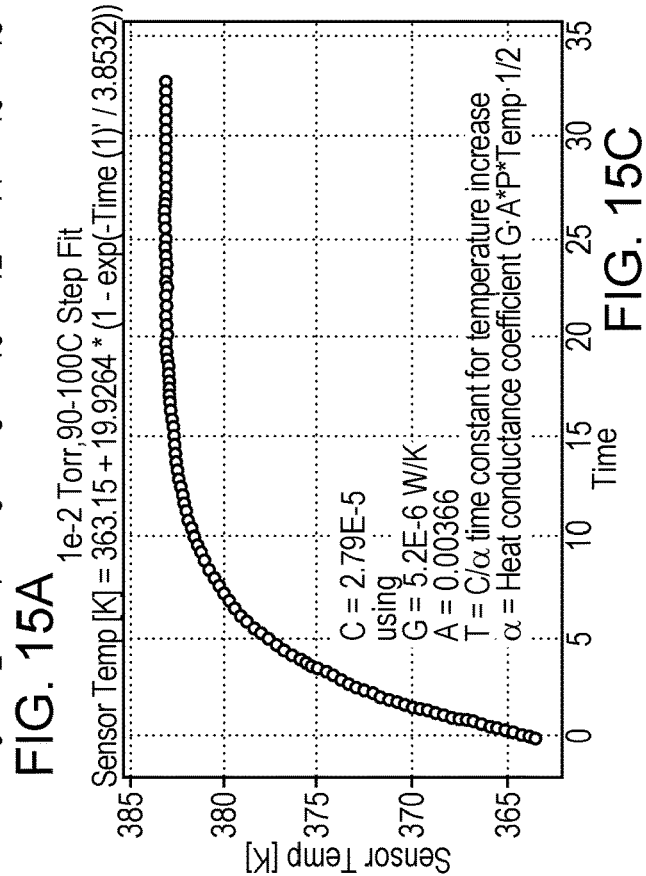

FIG. 14 is a plot of sensor temperature over time, and shows an additional calorimetry experiment in which $T_s$ is increased from: 20 to 100° C. The time constant is 5.49 seconds ($C_s$=2.86E-5), which is closely consistent with the data discussed above.

FIGS. 15A-D are plots of sensor temperature over time that show a series of time constants for a common sensor between 90 and 110° C. (i.e., 20° C. band around the nominal operation $T_{ref}$) and with gas pressures between zero pressure and 0.1 Torr. As shown, the time constant decreases as the pressure increases, due to the additional power required to maintain the wire at the requested temperatures. In all cases, $C_s$ was calculated using the known values of: G, A, P and $T_e$, using the relationships:

$$T = C_s/(G + A^*P^*T_e^{-1/2}) \quad (22)$$

Where,
G=5.2E-6 W/K
A=0.00366

Table 3, below, shows the Cs values calculated at the different pressures. The consistency in the Cs values, suggests that equation (22) is a proper physical model for the time constant.

TABLE 3

| Pressure [Torr] | Time Constant (T), sec | Cs [J/K] |
|---|---|---|
| Zero Pressure | 5.46919 | 2.86E-5 |
| 1E-3 | 5.37709 | 2.91E-5 |
| 1E-2 | 3.8532 | 2.79E-5 |
| 1E-1 | 0.969973 | 2.49E-5 |

Figure 16:
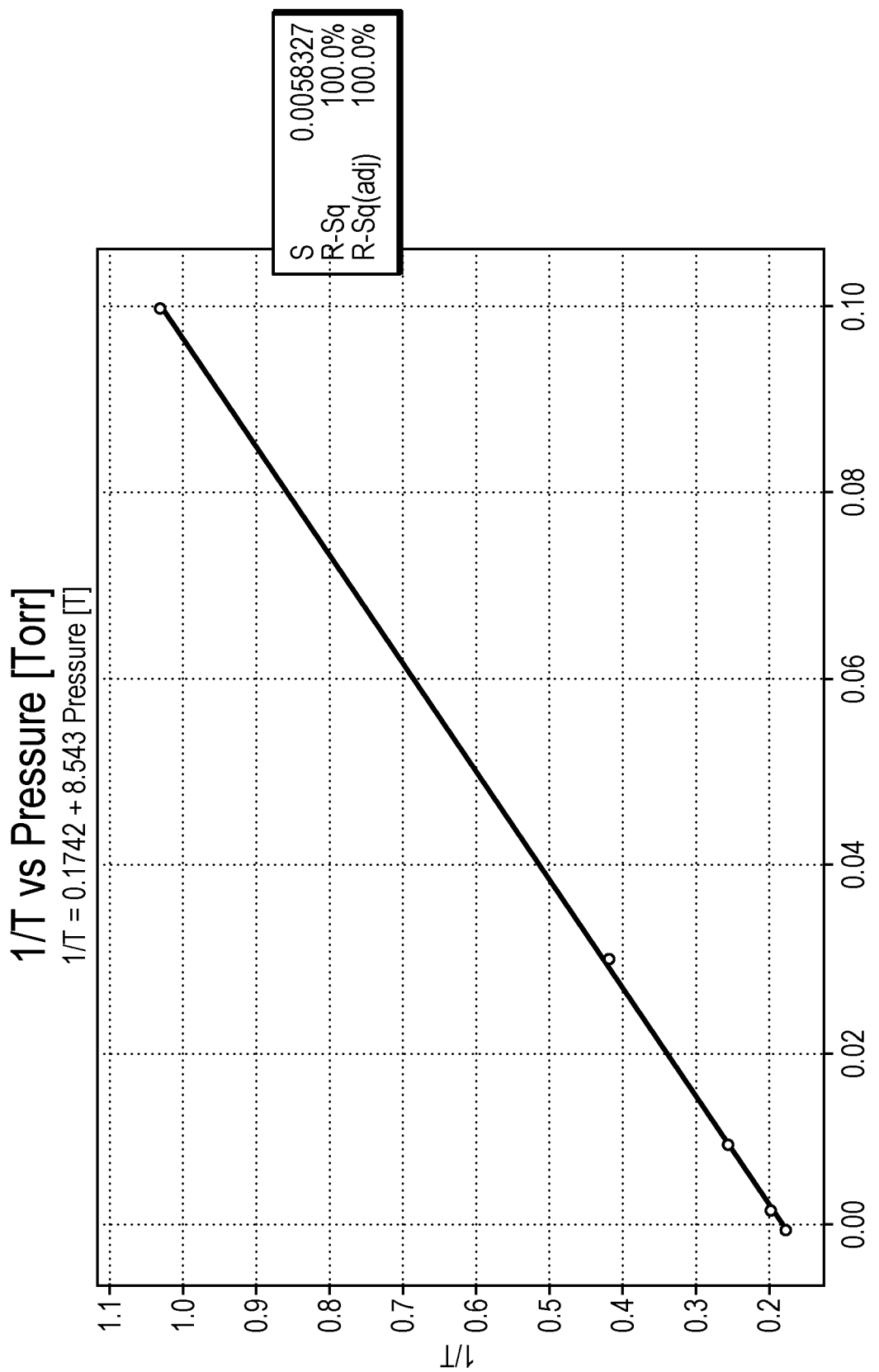
FIG. 16 is a plot of (l/T) vs. P in one embodiment.

FIG. 16 is a plot of (1/T) vs. P, which according to equation (23) below should yield a linear relationship:

$$(1/T) = (G/Cs) + (A^*T_e^{-1/2}/Cs)^*P \quad (23)$$

Where:
Intercept=G/Cs, eqn. 20→Cs=5.2E-6/0.1742=2.98E-5 J/K
Slope=$A^*Te^{1/2}$/Cs, eqn. 21→A=0.00437

With a known G value, the intercept of 1/T vs. P can be used to calculate $C_s$ and the slope can be used to derive A.

Figure 17:
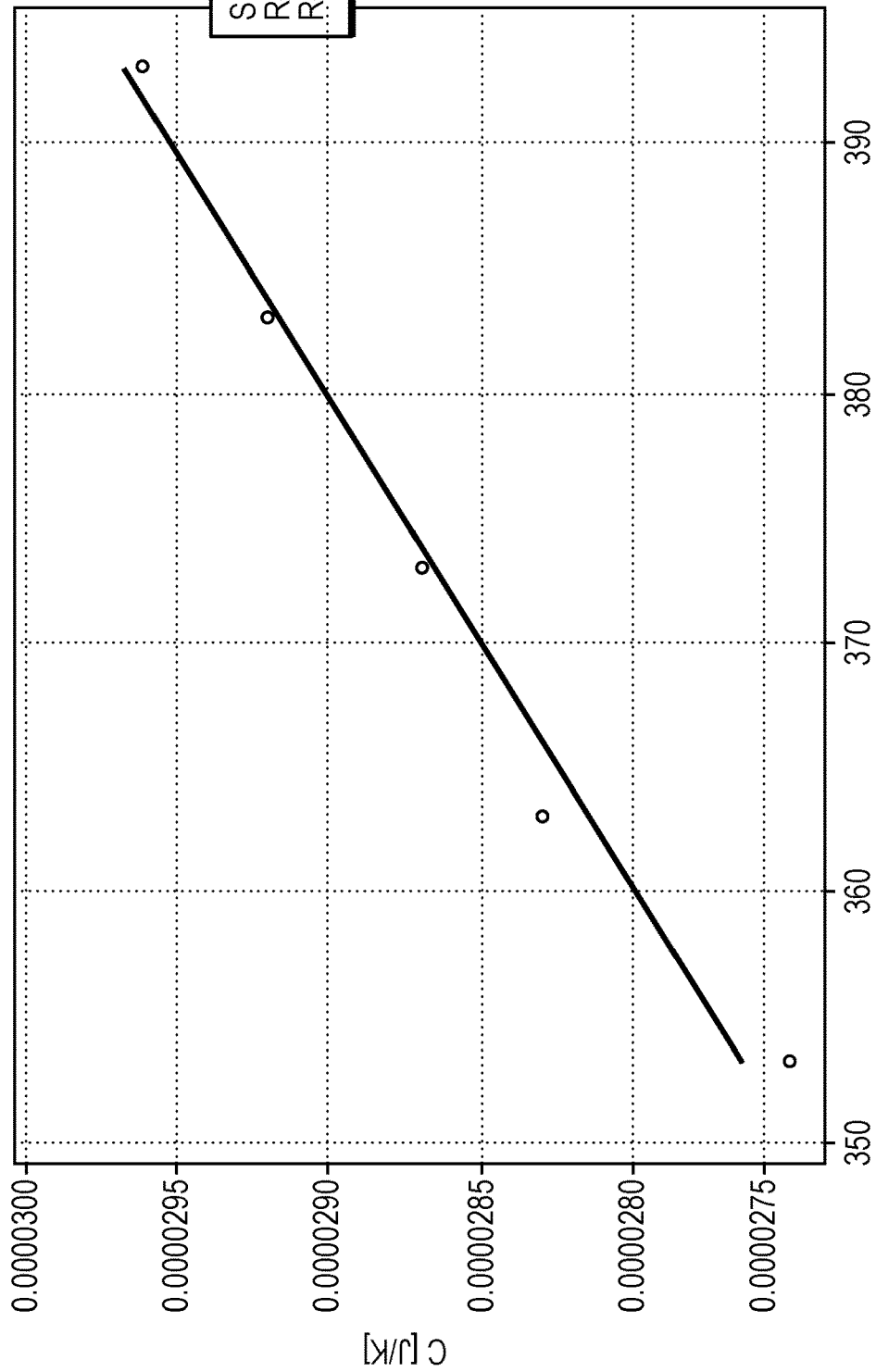
FIG. 17 is a plot of heat capacity as a function of wire temperature.

FIG. 17 is a plot of heat capacity as a function of wire temperature. Heat capacity, $C_s$, can be further characterized by its temperature dependence on $T_s$: $C_s$ ($T_s$). In one example, the heat capacity can be calculated, at several different $T_s$ values around nominal operational setting, using 10° C. sensor wire temperature steps (i.e. +/−5C) around the target temperature. A linear dependence of the heat capacity on $T_s$ is identified in FIG. 17:

$$C_s(T_s) = 5.1E-8 [J/K^2]^*T_s[K] + 9.629E-6 \text{ J/K}$$

$$C_s(T_s = 373K) = 2.87E-5 \text{ J/K}$$

The dependence of Cs on the sensor wire temperature is most likely related to changes in the temperature gradients wire with $T_s$. As the temperature of the wire increases more of the assembly is engaged and the heat capacity of the extended thermal system increases.

Summary of Process for Determining Heat Capacity

In view of the above, an example process for determining the heat capacity of a sensor wire follows:
a) Determine a: Measure wire resistance vs. temperature in the absence of self-heating.
b) Determine G and E: Measure power, $W_T$, as a function of $T_{ref}$, at Zero Pressure→Determine E from E.
c) Determine A from power measurement $W_T(P)$ at the middle of the low-pressure range and within the linear pressure range.
d) Determine $C_s$ from the exponential time constant heating the wire at Zero Pressure between two reference temperatures: $T_{low} \rightarrow T_{high}$.

The power delivered to the sensor is expressed according to equations (16) and (17), above. For a brand-new gauge, and a narrow temperature range around ambient, the contribution from radiative losses is 10% and equation (17) can be further simplified:

$$W_T(t) = G_o^*(T_s(t)-T_e) + A^*P^*(T_s(t)-T_e)T_e^{-1/2} + C_S^*[dT_s/dt] \quad (24)$$

Here, $G_o$=linear temperature coefficient for zero pressure power losses that includes the radiative losses over a narrow temperature range typical for the operation range of Pirani sensors (i.e., 0-60° C.).

The power term $C_s^*[dT_s/dt]$ provides an effective way to subtract gas independent heating power (consumed in the adjustment of sensor wire temperature) from the total power consumed by the sensor. The remaining power can then be used to calculate gas pressure accurately during fast pressure events such as overpressure or atmosphere venting events. As mentioned above, and because the heater can only source power, equation (17) is applied while $[dT_s/dt]>0$.

Including a heat capacity thermal coefficient into the design, calibration and pressure calculation of Pirani Sensors provides several distinct advantages, as described below.

Fast Pirani sensors are generally designed with small heated elements, notably MEMS scale. For wired designs, small wire diameter is generally preferred as it minimizes end losses due to thermal conductivity and improves response time due to reduced heat capacity. From a thermal model point of view, the size reduction addresses the fact that small sensors have smaller sensor wire assembly heat capacities and recover faster from sensor wire temperature changes, requiring less heating energy to restore their nominal sensor wire temperature. With the additional measurement of sensor wire temperature, and the consideration of the heat capacity term (in equation (17)) example embodiments can provide fast temporal response to fast events such as atmospheric vents even with larger sensor wire constructs.

Figure 18:
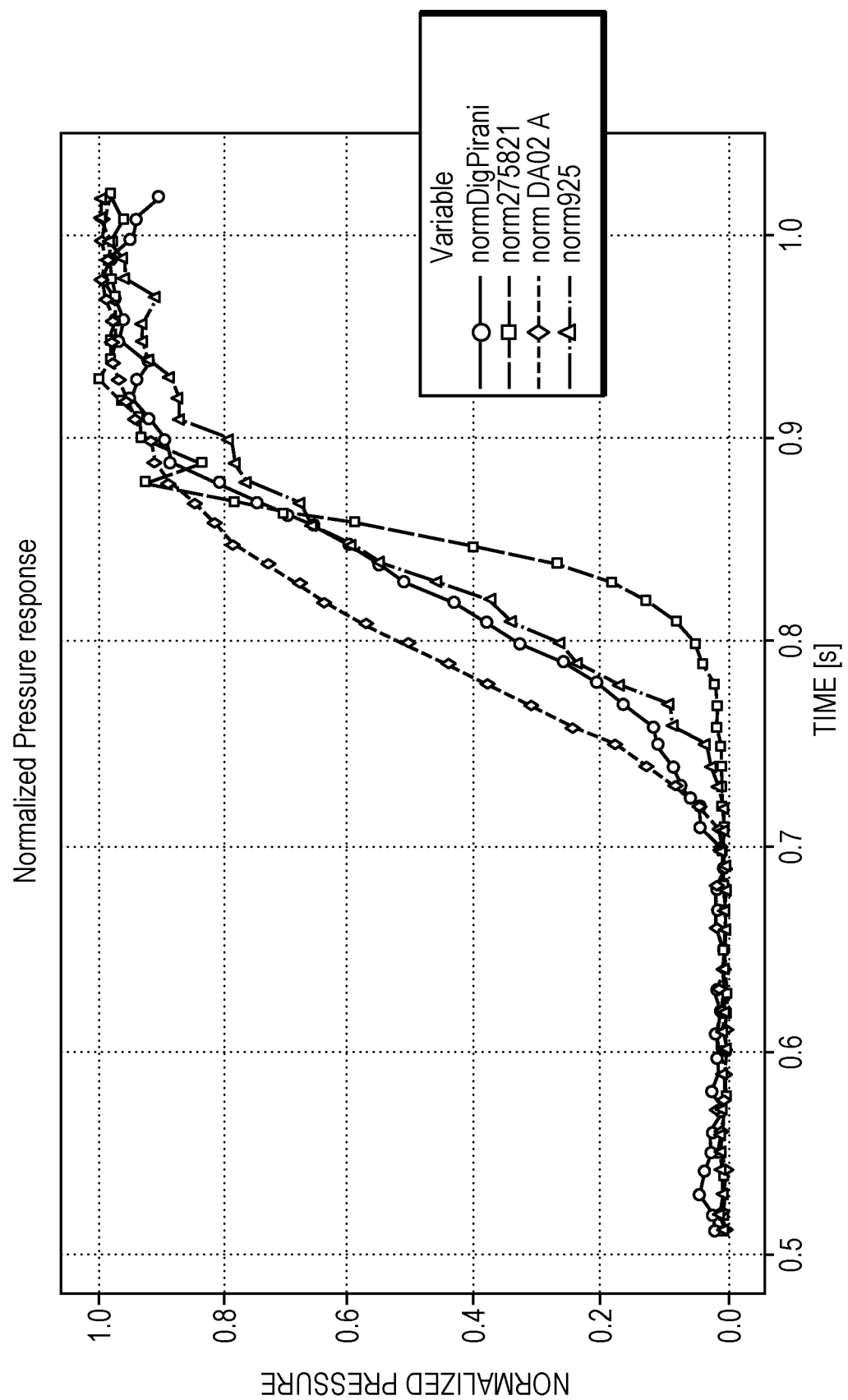
FIG. 18 is a plot of normalized pressure over time in one embodiment.

FIG. 18 is a plot of normalized pressure over time, and demonstrates the performance of a heat capacity-compensated sensor in an example embodiment in contrast to a MEMS scale, prior-art sensor. The diamond trace is the actual pressure transient curve as measured by a capacitance manometer with 10 millisecond response time. The triangle trace is the pressure response measured with a fast MEMS-scale Pirani gauge. The circle trace is the response of a standard Au coated Tungsten wire Pirani including 1) real time sensor wire temperature measurement and 2) heat capacity compensation as indicated in the last term of equation 13. The square trace represents a wire Pirani gauge with a fast temperature control system. As shown, this sensor works towards eventually catching up with the pressure transient, yet lags behind (i.e., underestimates the pressure) until the heater circuit winds operates to restore the wire temperature. The inclusion of the sensor wire temperature measurement and the heat capacity term for pressure calculation allows the gauge with the larger sensor wire in an example embodiment to match the dynamic response of one of the fastest conventional Pirani sensors.

Notably, larger sensor wires naturally pack more metallic material, being longer and having a larger diameter. A larger diameter means a more robust mechanical design and with better compatibility to vibrations common in vacuum systems. A large diameter also means enhanced robustness to reactive chemical products that can erode the metallic surface, providing longer sensor lifetime in the presence of corrosive species.

Example embodiments also provide advantages in calibration. Performing a measurement of heat capacity, $C_s$, during calibration not only provides the thermal coefficient needed to perform more accurate pressure calculations via equation (17), but also provides another measurement of a bulk thermal property related to the sensor wire construction. Heat capacity measurements can be used to track the manufacturing process looking for changes in sensor wire thermal properties. Sudden changes or long-term drift in heat capacity of sensors are indicative of manufacturing issues such as wire dimension or material composition variations.

Example embodiments also confer benefits in measurement by the gauge. Including the heat capacity of the sensor in the pressure calculations, equation (17), combined with real-time sensor wire temperature monitoring provides faster pressure measurement response, and accuracy, in the event of pressure transients. Pirani sensors are routinely used in load lock stations where fast vents are the norm, fast response is essential to improve speed and accuracy in those events.

While example embodiments have been particularly shown and described, it will be understood by those skilled in the art that various changes in form and details may be made therein without departing from the scope of the embodiments encompassed by the appended claims.

What is claimed is:

1. A thermal conductivity gauge, comprising:
   an envelope surrounding a gas volume;
   a sensor wire positioned within the gas volume; and
   a controller configured to:
      provide a model of power dissipation from the thermal conductivity gauge, the model including power loss due to conductive heat loss from sensor wire end contacts, radiative loss from the sensor wire toward the gas envelope, and pressure dependent conductive heat loss from the sensor wire through surrounding gas;
      apply a power input to the sensor wire to heat the sensor wire;
      measure total power dissipation $W_T$, sensor wire temperature $T_s$, and envelope temperature $T_e$ during the application of the power input; and
      determine gas pressure within the envelope based on the measured $W_T$, $T_s$ and $T_e$ and the model of power dissipation.

2. The thermal conductivity gauge of claim 1, wherein the thermal conductivity gauge is a Pirani gauge.

3. The thermal conductivity gauge of claim 1, wherein the controller is further configured to:
   at a subsequent time, measure subsequent values of total power dissipation $W_T$, sensor wire temperature $T_s$, and envelope temperature $T_e$ during the application of the power input; and
   determine a change in at least one of an end loss coefficient G and a radiative loss coefficient E over time based on the subsequent values.

4. The thermal conductivity gauge of claim 1, wherein the controller is further configured to:
   measure multiple distinct values of the total power dissipation $W_T$ and sensor wire temperature $T_s$ as the power input is varied;
   determine a mathematical fit for the multiple distinct values of the total power dissipation $W_T$ and sensor wire temperature $T_s$; and
   determine values of an end loss coefficient G and a radiative loss coefficient E based on the mathematical fit.

5. The thermal conductivity gauge of claim 4, wherein the envelope temperature $T_e$ is maintained at a constant value as the power input is varied.

6. The thermal conductivity gauge of claim 4, wherein the controller is further configured to output a notification to remove and replace the sensor wire based on a comparison of at least one of the end loss coefficient G and the radiative loss coefficient E against a reference value.

7. The thermal conductivity gauge of claim 4, wherein the controller is further configured to:
determine a gas accommodation coefficient A based on the mathematical fit, the gas accommodation coefficient A being dependent on a type of gas in the enclosure; and
determine the measure of gas pressure within the enclosure based on the gas accommodation coefficient A.

8. The thermal conductivity gauge of claim 1, wherein the controller is further configured to:
determine a heat capacity of the sensor wire Cs based on a change in the sensor wire temperature $T_s$ over a given period of time; and
determine the measure of gas pressure within the enclosure based on the heat capacity of the sensor wire $C_S$.

9. The thermal conductivity gauge of claim 8, wherein the controller determines the heat capacity of the sensor wire $C_S$ based on a rate of cooling of the sensor wire temperature $T_s$ over the given period of time.

10. The thermal conductivity gauge of claim 8, wherein the controller determines the measure of gas pressure during an increase of the gas pressure within the enclosure.

11. A method of operating a thermal conductivity gauge comprising a sensor wire in a gas volume within an envelope, comprising:
providing a model of power dissipation from the thermal conductivity gauge, the model including power loss due to conductive heat loss from sensor wire end contacts, radiative loss from the sensor wire toward the gas envelope, and pressure dependent conductive heat loss from the sensor wire through surrounding gas;
applying a power input to the sensor wire;
measuring total power dissipation $W_T$, sensor wire temperature $T_s$, and envelope temperature $T_e$ during the application of the power input; and
determining gas pressure within the envelope based on the measured $W_T$, $T_s$ and $T_e$ and the model of power dissipation.

12. The method of claim 11, wherein the thermal conductivity gauge is a Pirani gauge.

13. The method of claim 11, further comprising:
at a subsequent time, measuring subsequent values of total power dissipation $W_T$, sensor wire temperature $T_s$, and envelope temperature $T_e$ during the application of the power input; and
determining a change in at least one of an end loss coefficient G and a radiative loss coefficient E over time based on the subsequent values.

14. The method of claim 11, further comprising:
measuring multiple distinct values of the total power dissipation $W_T$ and sensor wire temperature $T_s$ as the power input is varied;
determining a mathematical fit for the multiple distinct values of the total power dissipation $W_T$ and sensor wire temperature $T_s$, and
determining values of an end loss coefficient G and a radiative loss coefficient E based on the mathematical fit, the model of power dissipation incorporating the end loss coefficient G and radiative loss coefficient E.

15. The method of claim 14, wherein the envelope temperature $T_e$ is maintained at a constant value as the power input is changed.

16. The method of claim 14, further comprising selectively removing and replacing the sensor wire based on a comparison of at least one of the end loss coefficient G and the radiative loss coefficient E against a reference value.

17. The method of claim 14, further comprising:
determining a gas accommodation coefficient A based on the mathematical fit, the gas accommodation coefficient A being dependent on a type of gas in the enclosure; and
determining the measure of gas pressure within the enclosure based on the gas accommodation coefficient A.

18. The method of claim 11, further comprising:
determining a heat capacity of the sensor wire Cs based on a change in the sensor wire temperature $T_s$ over a given period of time; and
determining the measure of gas pressure within the enclosure based on the heat capacity of the sensor wire $C_S$.

19. The method of claim 18, wherein determining the heat capacity of the sensor wire $C_S$ is based on a rate of cooling of the sensor wire temperature $T_s$ over the given period of time.

20. The method of claim 18, wherein determining the measure of gas pressure occurs during an increase of the gas pressure within the enclosure.

21. The method of claim 11, further comprising modeling a zero offset of the thermal conductivity gauge by:
evacuating the envelope to zero pressure;
applying a power input to the sensor wire;
measuring total power dissipation $W_T$, sensor wire temperature $T_s$, and envelope temperature $T_e$ during the application of the power input; and
determining an end loss coefficient G and a radiative loss coefficient E in the model of power dissipation as a function of $W_T$, $T_s$, and $T_e$.

22. The method of claim 21, wherein the end loss coefficient G corresponds to heat loss at end posts during application of the power input to the sensor wire, the end posts being coupled to the sensor wire.

23. The method of claim 21, wherein the radiative loss coefficient E corresponds to radiative loss by the sensor wire during application of the power input to the sensor wire.

24. The method of claim 21, further comprising:
determining a temperature compensation value that compensates for variation of at least one of sensor wire temperature and envelope temperature, the temperature compensation value being a function of at least one of the end loss coefficient G and the radiative loss coefficient E; and
determining the measure of gas pressure based on the temperature compensation value.

25. A method of operating a thermal conductivity gauge, comprising:
applying a power input to a sensor wire in a gas volume within an envelope of the thermal conductivity gauge when the gas volume exhibits zero pressure;
measuring total power dissipation $W_T$, sensor wire temperature $T_s$, and envelope temperature $T_e$ during the application of the power input;
determining a heat capacity of the sensor wire $C_S$ based on a change in the sensor wire temperature $T_s$ over a given period of time; and
determining a measure of gas pressure within the envelope based on the heat capacity of the sensor wire $C_S$ and a measure of the power input applied to the sensor wire.

26. The method of claim 25, wherein determining the heat capacity of the sensor wire $C_s$ is based on a rate of cooling of the sensor wire temperature $T_s$ over the given period of time.

27. The method of claim 25, wherein determining the measure of gas pressure occurs during an increase of the gas pressure within the enclosure.

28. A thermal conductivity gauge, comprising:
an envelope surrounding a gas volume;
a sensor wire positioned within the gas volume; and
a controller configured to:
apply a power input to the sensor wire of the thermal conductivity gauge when the gas volume exhibits zero pressure;
measure total power dissipation $W_T$, sensor wire temperature $T_s$, and envelope temperature $T_e$ during the application of the power input heating the sensor wire;
determine a heat capacity of the sensor wire $C_S$ based on a change in the sensor wire temperature $T_s$ over a given period of time; and
determine a measure of gas pressure within the envelope based on the heat capacity of the sensor wire $C_S$ and a measure of the power input applied to the sensor wire.

29. The thermal conductivity gauge of claim 28, wherein the controller determines the heat capacity of the sensor wire $C_S$ based on a rate of cooling of the sensor wire temperature $T_s$ over the given period of time.

30. The thermal conductivity gauge of claim 28, wherein the controller determines the measure of gas pressure during an increase of the gas pressure within the enclosure.

31. A method of operating a thermal conductivity gauge comprising a sensor wire in a gas volume within an envelope, comprising:
modeling a zero offset of the thermal conductivity gauge by:
evacuating the envelope to zero pressure;
applying a power input to the sensor wire;
measuring total power dissipation $W_T$, sensor wire temperature $T_s$, and envelope temperature $T_e$ during the application of the power input; and
determining an end loss coefficient G and a radiative loss coefficient E as a function of $W_T$, $T_s$, and $T_e$;
providing a model of power dissipation from the thermal conductivity gauge, the model incorporating the end loss coefficient G and the radiative loss coefficient E;
applying a power input to the sensor wire;
measuring total power dissipation $W_T$, sensor wire temperature $T_s$, and envelope temperature $T_e$ during the application of the power input; and
determining gas pressure within the envelope based on the measured $W_T$, $T_s$ and $T_e$ and the model of power dissipation.

32. The method of claim 31, wherein the model of power dissipation further includes power loss due to conductive heat loss from sensor wire end contacts, radiative loss from the sensor wire toward the gas envelope, and pressure dependent conductive heat loss from the sensor wire through surrounding gas.

33. The method of claim 31, wherein the end loss coefficient G corresponds to heat loss at end posts during application of the power input to the sensor wire, the end posts being coupled to the sensor wire.

34. The method of claim 31, wherein the radiative loss coefficient E corresponds to radiative loss by the sensor wire during application of the power input to the sensor wire.

35. The method of claim 31, further comprising:
determining a temperature compensation value that compensates for variation of at least one of sensor wire temperature and envelope temperature, the temperature compensation value being a function of at least one of the end loss coefficient G and the radiative loss coefficient E; and
determining the measure of gas pressure based on the temperature compensation value.

* * * * *